United States Patent [19]
Yasohara et al.

[11] Patent Number: 6,021,058
[45] Date of Patent: Feb. 1, 2000

[54] PWM INVERTER WITH ZERO DEAD TIME AND INITIAL POWER SUPPLY CAPACITOR CHARGING

[75] Inventors: Masahiro Yasohara, Amagasaki; Yasushi Kato, Uji; Shinichi Emura, Neyagawa; Kazuyuki Takada, Hirakata; Yuji Tanaka, Takatsuki; Kouji Takada, Kameoka; Ryutaro Arakawa, Amagasaki, all of Japan

[73] Assignee: Matsushita Electric Industrial Co., Ltd., Osaka-fu, Japan

[21] Appl. No.: 09/129,428

[22] Filed: Aug. 5, 1998

[30] Foreign Application Priority Data

Aug. 7, 1997 [JP] Japan ..................................... 9-213025

[51] Int. Cl.[7] ................................................ H02M 7/5395

[52] U.S. Cl. .................................. 363/98; 363/41; 363/32

[58] Field of Search .................................. 363/41, 95, 98, 363/132

[56] References Cited

U.S. PATENT DOCUMENTS

| | | | |
|---|---|---|---|
| 5,166,870 | 11/1992 | Shimizu et al. | 363/42 |
| 5,451,900 | 9/1995 | Haga et al. | 330/10 |
| 5,535,115 | 7/1996 | Kishi et al. | 363/98 |
| 5,859,770 | 1/1999 | Takada et al. | 363/132 |

*Primary Examiner*—Jeffrey Sterrett
*Attorney, Agent, or Firm*—Greenblum & Bernstein, P.L.C.

[57] ABSTRACT

A PWM inverter output circuit enabling circuit integration, having a fast response characteristic, and unaffected by dv/dt transients is provided. A predrive circuit 17 drives a power circuit 11 comprising first and second power elements P1 and P2 by controlling the gate and source potential of the power elements P1 and P2 based on a stored control state. The control state is detected from a logic signal output from an input signal processor 13, which converts a command signal instructing turning on and off the power elements P1 and P2 to predetermined logic signals. Operating power is drawn from a main dc power source V1, a control power source V2, and a power supply capacitor C1 that is charged using an output voltage from the control power source V2. The gates and sources of the power elements P1 and P2 are connected together.

31 Claims, 19 Drawing Sheets

Fig.5

| Input | | Output | |
|---|---|---|---|
| A | B | X | Y |
| L | * | H→L | H→L |
| H | H | H→L | L |
| H | L | L | H→L |

Fig.17

| Input | Output | |
|---|---|---|
| A | X | Y |
| L | L | H→L |
| H | H→L | L |

PWM INVERTER WITH ZERO DEAD TIME AND INITIAL POWER SUPPLY CAPACITOR CHARGING

FIELD OF THE INVENTION

The present invention relates to a power circuit of a pulse width modulation inverter used for pulse width modulation control of the winding voltage in an electric motor.

BACKGROUND OF THE INVENTION

Pulse width modulation (PWM) inverters for motor control applications have become common in recent years. A PWM inverter controls motor operation (driving) by controlling the voltage supplied to the motor by means of pulse width modulation. A common PWM inverter of this type is described below with reference to a typical block diagram thereof as shown in FIG. 20.

In the PWM inverter, the effective voltage and base frequency of a three-phase ac voltage waveform supplied to a motor 360 are first set in a frequency regulator 358. The PWM control circuit 359 then generates a three-phase PWM signal based on the voltage and frequency information set by the frequency regulator 358, and outputs this three-phase PWM signal as switching command signals 342, 361, and 362.

The switching command signals 342, 361, and 362 are two-value signals controlling whether motor winding terminals 352, 363, and 364 connect with the positive or negative terminal of a main dc power source 314. The frequency of the switching command signals 342, 361, and 362 is also known as the PWM carrier frequency, and is typically a frequency at least 100 times the base frequency of the three-phase ac voltage wave supplied to the motor 360.

As a result, the PWM carrier frequency typically ranges from 2 kHz to 20 kHz for a base frequency of 0 Hz to 200 Hz in the three-phase ac voltage wave supplied to the motor.

The motor free signal 356 is a two-value signal controlling whether the motor is set to a free-run mode. When the motor is set to this free-run mode, the motor winding terminals 352, 363, and 364 are disconnected from both the positive and negative terminals of the main dc power source 314 to protect the motor and control equipment when trouble occurs.

The PWM inverter output circuit 353 is a semiconductor switching circuit for controlling connection of the motor winding terminals 352, 363, and 364 to the positive or negative terminal of the main dc power source 314 based on the switching command signals 342, 361, and 362 input respectively thereto.

An exemplary PWM inverter output circuit 353 is described in Japanese Patent Laid-Open Publication No.6-284740 and shown in FIG. 21. Referring to FIG. 21, a signal equivalent to the switching command signals 342, 361, and 362 is input to an input terminal 203, and a signal equivalent to the motor free signal 356 is input to another input terminal 201. Motor winding terminal 352, 363, or 364 is equivalent to output terminal 205. The main dc power source 314 is equivalent to power source Vb. A distinguishing feature of this PWM inverter output circuit is that a switching operation with zero dead time is possible. More specifically, an n-channel power MOSFET 301 and a p-channel power MOSFET 302 are used as the power elements of a power circuit for outputting a predetermined high or low voltage from the output terminal 205 in this circuit, and the MOSFETs 301 and 302 are connected with common gates and sources.

It is therefore possible to alternately switch the power elements 301 and 302 on and off, switch the output terminal 205 to the positive or negative side of the power source Vb, and thereby output a high or low voltage by controlling the common gates of the power elements (MOSFETs) 301 and 302 using constant current elements (transistors) 119 and 229. Note that because of the common gate and source connections of the power MOSFETs 301 and 302, they cannot both be simultaneously on. PWM switching control with zero dead time is thus possible. Zero dead time switching control also prevents control error from occurring in the power circuit, thus suppressing motor noise vibration and torque fluctuations, and reducing power consumption.

In a PWM inverter output circuit related to the above mentioned invention, the constant current elements (transistors) 119 and 229 operate at a high voltage level, typically on the order of 300 V. The constant current elements (transistors) 119 and 229 thus produce heat when the power elements 301 and 302 switch on and off, and thereby inhibit further reductions in the size, power consumption, and cost of the circuit.

Circuit integration is widely known to be an effective means of reducing size, power consumption, and cost. While integration of the PWM inverter output circuit is therefore also desirable, it is necessary to resolve the aforementioned problem of transistor heat emissions.

The invention disclosed in Japanese Patent Laid Open Publication No.7-15978 was proposed as a solution to this problem by driving a power element pair by means of gate amplifiers. The gate amplifiers drive the power elements by drawing energy stored to a power supply capacitor. Because the voltage applied to the gate amplifier depends upon the voltage at both ends of the power supply capacitor, the applied voltage is necessarily controlled, heat generated by the gate amplifier is suppressed, and the problem of heat generation can be solved.

A problem with this invention, however, is that one of the pair of power elements in each phase, specifically the low voltage power element, must be turned on to complete a charging path when the power supply capacitor is charged. This introduces some substantial limitations with respect to motor control as described below.

Specifically, when a rotor of the motor is rotated by some external factor and an induction voltage is thus generated in the motor winding, turning the power element on the low voltage side on can short and damage the motor armature. Initial charging of the power supply capacitor is thus not possible. The technology disclosed in Japanese Patent Laid Open Publication No.7-15978 thus cannot be used for applications in which the rotor may be forcibly turned by the wind or other external factor. The fan motor in an outdoor compressor unit of an air conditioning system is one example of such applications.

When a motor is driven with PWM control, it is also not possible to sustain uninterrupted motor operation unless the low voltage power element is turned on to charge and refresh the power supply capacitor every PWM control cycle, that is, at a frequency of generally less than 1 ms. As a result, this technology also cannot be applied in, for example, two-phase PWM control applications in which the switching frequency is low. Note that the two-phase PWM control as used herein refers to the common PWM control technology known to be effective for reducing switching loss and leakage current by PWM switching two of the three phases and not switching one phase in a three-phase PWM inverter to control the drive voltage of the motor.

A similar PWM inverter output circuit is described in Japanese Patent Laid Open Publication No.4-230117 relating to a level shift circuit. This level shift circuit comprises a level shift transistor for level shifting, and prevents misoperation resulting from fast dv/dt transient phenomena occurring as a result of a floating capacitance at the drain or collector of the level shift transistor. To prevent the effects of a dv/dt transient signal resulting, for example, from noise, in the control pulse controlling the output driver, the cited invention comprises a pulse filter for filtering the control pulse applied to the output driver circuit for driving the power circuit. In other words, the effects of a fast dv/dt transient signal are prevented by means of the pulse filter blocking any control signal causing a change in voltage at shorter than a prescribed time.

The pulse filter of this method can thus prevent misoperation resulting from a fast dv/dt transient signal, but passes slow dv/dt transient signals and therefore cannot prevent misoperation caused thereby. A gentle dv/dt slope therefore cannot be used for noise suppression, causing problems in both circuit design and operation. Passing the control pulse to the output driver circuit through a pulse filter also introduces a delay, and thereby causes a drop in the overall response time.

SUMMARY OF THE INVENTION

The present invention is therefore directed to a PWM inverter output circuit enabling PWM control with zero dead time, producing little heat, enabling circuit integration, providing fast response, and resistant to the effects of a dv/dt transient state.

The present invention is further directed to a PWM inverter output circuit whereby initial charging of a power supply capacitor is possible even when the rotor of the motor is forcibly rotated by some external factor, motor operation can be sustained even without refreshing the charge to a capacitor used for a long-term power supply, and application is also possible with two-phase PWM control wherein the frequency of switching is low.

To achieve this object, a PWM inverter output circuit according to a preferred embodiment of the invention comprises a main dc power source; a power circuit; a control power source; a power supply capacitor charged using an output voltage of the control power source; an input signal processor for receiving a command signal which controls turning on and off said power elements and for producing a predetermined plurality of logic signals from said command signal; and a predrive circuit.

The power circuit has a first power element comprising a first control electrode and a first reference electrode, and being conductive when a positive voltage with respect to the first reference electrode is applied to the first control electrode, and a second power element comprising a second control electrode and a second reference electrode, and being conductive when a negative voltage with respect to the second reference electrode is applied to the second control electrode. The first and second reference electrodes are connected together, and the first and second control electrodes are connected together.

The predrive circuit has a state detection circuit for detecting a requested control state from a combination of said plurality of logic signals output from the input signal processor, a latch circuit for holding a control state detected by the state detection circuit, a first output driver comprising a pair of switching elements serially connected between terminals of the power supply capacitor for controlling a voltage applied to said first and second control electrodes, and a second output driver comprising a pair of switching elements serially connected between terminals of the power supply capacitor for controlling a voltage applied to said first and second reference electrodes.

In a PWM inverter output circuit thus comprised, the first and second output drivers control a voltage between the first control electrode and the first reference electrode and a voltage between the second control electrode and the second reference electrode. The first and second output drivers drive said power circuit using the power supply capacitor as a power source, by turning on and off (opening and closing) said switching elements based on the control state held by the latch circuit.

BRIEF DESCRIPTION OF THE DRAWINGS

Other objects and attainments together with a fuller understanding of the invention will become apparent and appreciated by referring to the following description and claims taken in conjunction with the accompanying drawings, in which like parts are designated by like reference numerals and in which:

FIG. 5 is a truth table showing the relationship between inputs and outputs to the logic circuit of the input signal processor shown in FIG. 1;

FIG. 17 is a truth table showing the relationship between inputs and outputs to the logic circuit of the input signal processor shown in FIG. 12;

DESCRIPTION OF THE PREFERRED EMBODIMENTS

The preferred embodiments of a PWM inverter output circuit according to the present invention are described below with reference to the accompanying drawings.

(Embodiment 1)

A. Circuit Configuration

Figure 1:
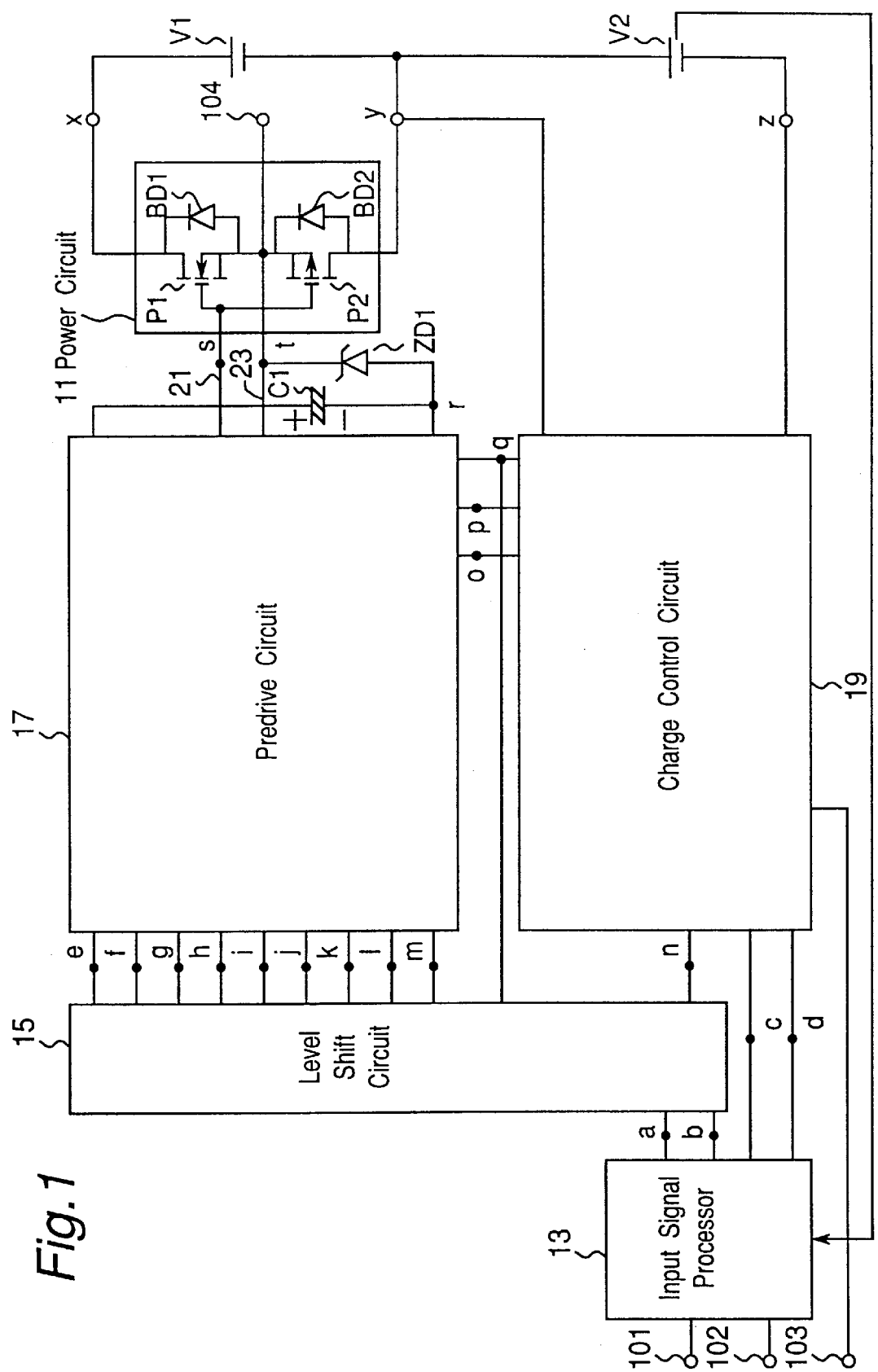
FIG. 1 is a block diagram of a PWM inverter output circuit according to a first embodiment of the present invention.

FIG. 1 is a block diagram of a PWM inverter output circuit according to a preferred embodiment of the invention. As shown in FIG. 1, this PWM inverter output circuit comprises a power circuit 11 for outputting a drive voltage to a motor; an input signal processor 13 to which control information for controlling the power circuit 11 is input; a level shift circuit 15 for setting a signal line carrying the control information to a predetermined control state based on the supplied control information; a predrive circuit 17 for controlling driving the power circuit 11 based on the control state of the signal line; a power supply capacitor C1 for supplying a voltage for driving the power circuit 11; a charge control circuit 19 for controlling charging the power supply capacitor C1; a main dc power source V1 for supplying an output voltage; and a control power source V2 for supplying power for driving the overall circuitry of the PWM inverter output circuit. These elements of the PWM inverter output circuit are described in further detail below.

As shown in FIG. 1, the power circuit 11 comprises a first power element P1 and a second power element P2 where the first power element P1 is an n-channel MOSFET, the second power element P2 is a p-channel MOSFET, and the sources and gates of the power elements P1 and P2 are connected together. The drain of the first power element P1 is connected to the high voltage side of the main dc power source V1, and the drain of the second power element 22 is connected to the low voltage side of the main dc power source V1. The output contact of the power circuit 11 is taken from the common connection between the sources of the power elements P1 and P2, and is connected to the output terminal 104. A parasitic diode BD1 and BD2, respectively, is present between the source and the drain of the MOSFET power elements P1 and P2.

Figure 2:
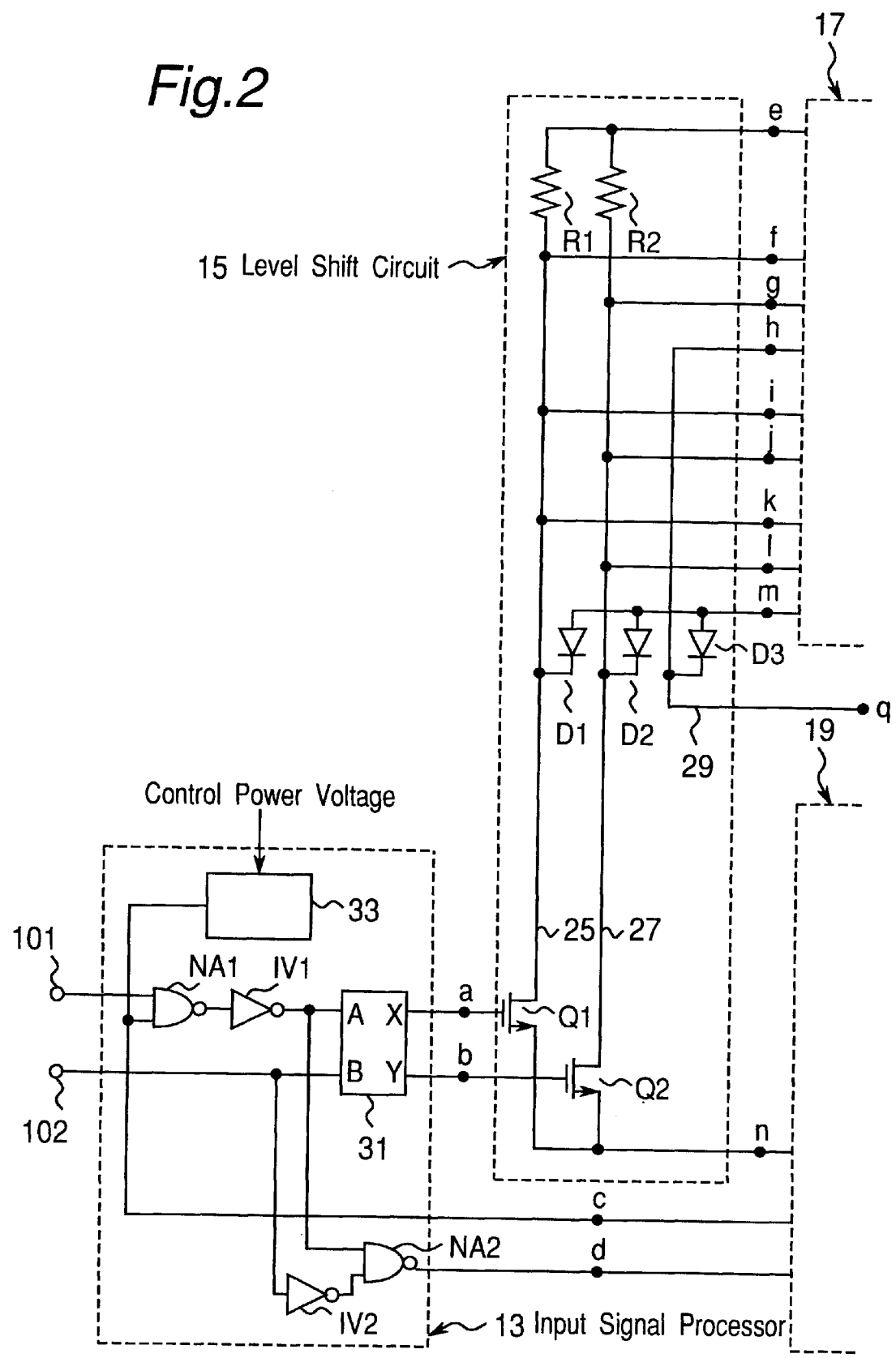
FIG. 2 is a circuit diagram of the input signal processor and level shift circuit of the PWM inverter output circuit shown in FIG. 1.

Schematic diagrams of the input signal processor 13 and level shift circuit 15 are shown in FIG. 2. As shown in the figure, the input signal processor 13 comprises NAND gates NA1 and NA2, inverters IV1 and IV2, a logic circuit 31 and a control power monitor 33.

The control power monitor 33 monitors the voltage of the control power source V2, outputs high when the detected voltage of the control power source V2 is within a predetermined normal range, and otherwise outputs low.

Figure 5:
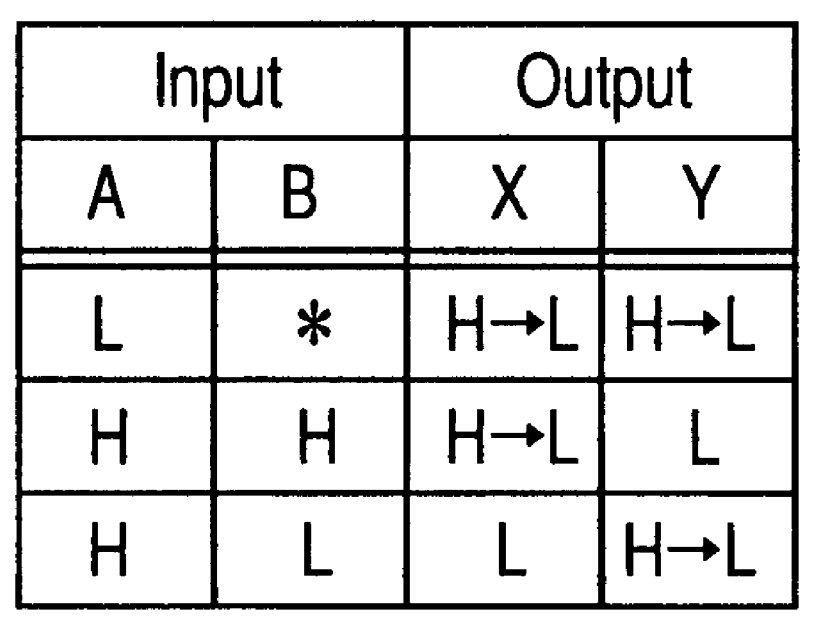

The logic circuit 31 has inputs A and B and outputs X and Y, and operates according to a truth table such as shown in FIG. 5. Note that in FIG. 5 an asterisk (*) indicates any desired value, and an arrow (→) indicates a predetermined state change after a predetermined period of time.

The input signal processor is further provided with input terminals 101 and 102 to input control information for the power circuit 11.

The level shift circuit 15 comprises signal lines 25, 27, and 29; resistors R1 and R2; MOSFETs Q1 and Q2; and diodes D1 to D3. The resistor R1 and the n-channel MOSFET Q1 are connected in series on signal line 25, and the resistor R2 and the n-channel MOSFET Q2 are connected in series on the signal line 27. The gates of MOSFETs Q1 and Q2 are connected respectively to outputs X and Y of the logic circuit 31 in the input signal processor 13.

Signal lines 25 and 27 are connected between the high voltage side of the predrive circuit 17 at one end after passing resistors R1 and R2, respectively, and a ground line from which the reference potential of the PWM inverter output circuit is supplied at the other end after passing MOSFETs Q1 and Q2, respectively. As a result, when the MOSFETs Q1 and Q2 are off, signal lines 25 and 27 are high. When MOSFETs Q1 and Q2 are on, an approximately 1 mA current emitted from the MOSFETs Q1 and Q2 causes a voltage drop at resistors R1 and R2, and the signal lines 25 and 27 go low. The signal lines 25 and 27 are thus controlled to a particular control state based on the output of the logic circuit 31 in the input signal processor 13.

Note that the diodes D1 to D3 shown in FIG. 2 are provided as input protection for the state detection circuit 34 of the predrive circuit 17 as described below.

Note that while not specifically shown in the figures, floating capacitances dependent on the wiring and various circuit elements are present on signal lines 25, 27, and 29.

Figure 3:
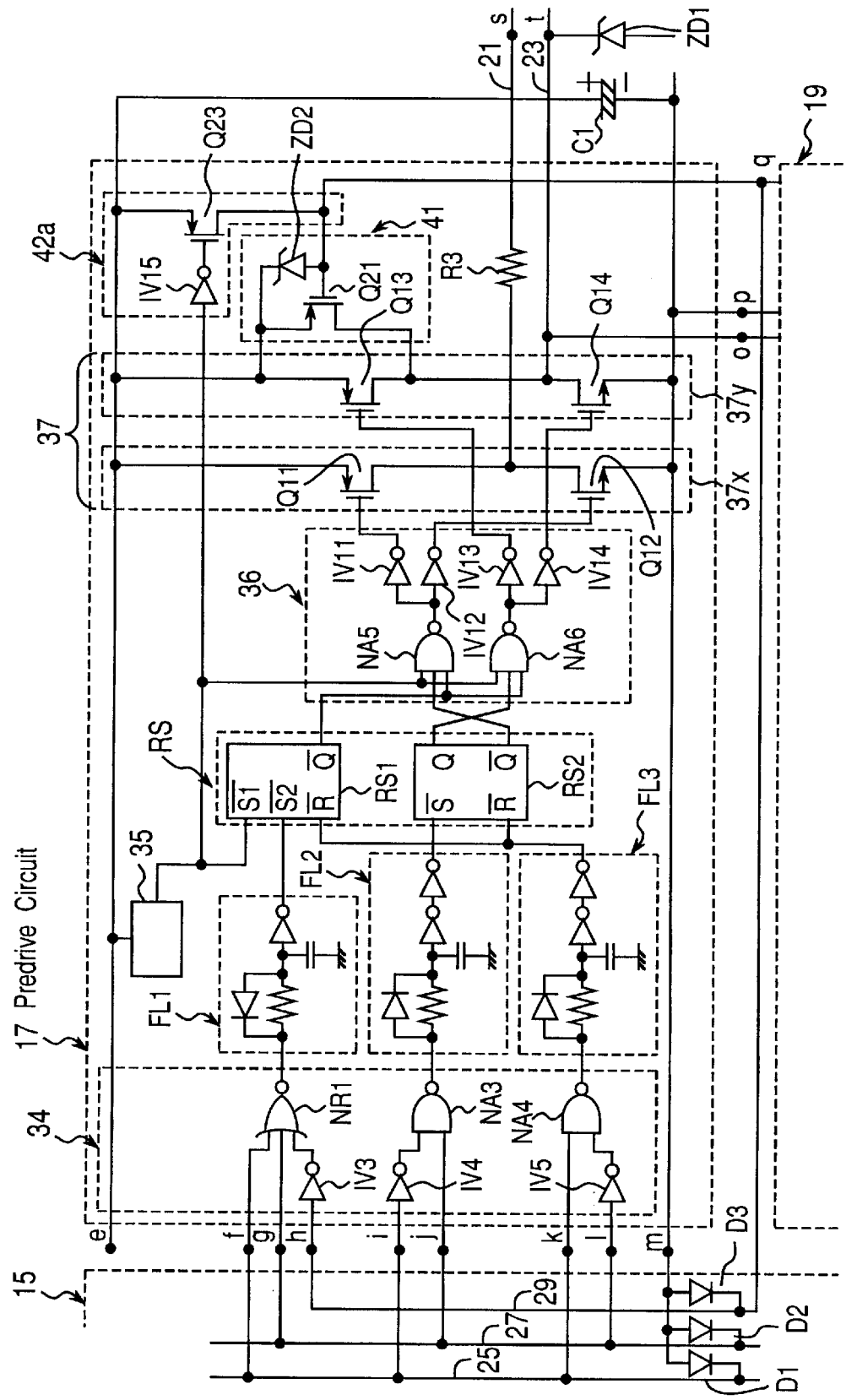
FIG. 3 is a circuit diagram of the predrive circuit shown in FIG. 1.

In FIG. 3, a circuit diagram of the predrive circuit 17 is shown. The predrive circuit 17 comprises a state detection circuit 34, filter circuits FL1 to FL3, latch circuits RS1 and RS2, a driver control circuit 36, an output driver circuit 37, a bypass circuit 41, a bypass control circuit 42a, and an insufficient voltage detector 35 for detecting a low voltage level in the power supply capacitor.

The state detection circuit 34 comprises NOR gate NR1, NAND gates NA3 and NA4, and inverters IV3 to IV5.

The state detection circuit 34 detects any state in which the signal lines 25, 27, and 29 of the level shift circuit 15 are not all high or low. More specifically, the NOR gate NR1 outputs high only when the signal lines 25, 27, and 29 are detected low, low, and high; NAND gate NA3 outputs low only when signal lines 25 and 27 are detected low and high; and NAND gate NA4 outputs low only when signal lines 25 and 27 are detected high and low. The state detection circuit 34 thus detects the above three logic states of the signal lines 25, 27, and 29 as meaningful control states.

By thus detecting states other than the states in which the signal lines 25, 27, and 29 are all either high or low, it is possible to prevent misoperation resulting from the effects of a floating capacitance present on the signal lines 25, 27, and 29.

The filter circuits FL1 to FL3 comprise a resistance, a diode, a capacitor, and an inverter. The latch circuits RS1 and RS2 are RS flip-flops. Latch circuit RS1 comprises contacts for set input /S1 and /S2, reset input /R, and output /Q; latch circuit RS2 comprises contacts for set input /S, reset input /R, and outputs Q and /Q. Note that "/" indicates active low. The order of precedence in latch circuit RS1 is /S1>/R>/S2, and in latch circuit RS2 is /S>/R. Note, further, that the driver control circuit 36 comprises NAND gates NA5 and NA6, and inverters IV11 to IV14.

The output driver circuit 37 comprises serially connected switching elements Q11 and Q12 as a first output driver, and serially connected switching elements Q13 and Q14 as a second output driver. Switching elements Q11 and Q13 are p-channel MOSFETs, and switching elements Q12 and Q14 are n-channel MOSFETs.

The output of the first output driver is obtained from a node between the switching elements Q11 and Q12, and is passed through a resistor R3 to a gate potential control line 21 for controlling the gate potential of power elements P1 and P2. The output of the second output driver is obtained from a node between the switching elements Q13 and Q14, and is connected directly to a reference potential control line 23 for controlling the source potential of the power elements P1 and P2.

The bypass circuit 41 comprises a p-channel MOSFET Q21 and a Zener diode ZD2, and is parallel connected to switching element Q13. The Zener diode ZD2 is connected between the gate and source of the p-channel MOSFET Q21.

The bypass control circuit 42*a* is used for controlling turning on and off (opening and closing) the bypass circuit 41 by means of an inverter IV15 and p-channel MOSFET Q23. The output from the insufficient voltage detector 35 is input to the inverter IV15 of the bypass control circuit 42*a*.

The insufficient voltage detector 35 detects whether the voltage stored to the power supply capacitor C1 is sufficient to switch the power circuit 11 on and off. The insufficient voltage detector 35 outputs high when the voltage stored to the power supply capacitor C1 is within a normal voltage range sufficient to switch the power circuit 11 on and off, and otherwise outputs low. The insufficient voltage detector 35 outputs to both the latch circuit RS1 and bypass control circuit 42*a*.

With this predrive circuit 17, the on/off state of the switching elements Q11 to Q14 in the output driver circuit 37 is controlled to control the potential of control lines 21 and 23. Thus, the power elements P1 and P2 of the power circuit 11 turn on and off. Note that the power supply capacitor C1 is connected to both ends of the output driver circuit 37 as the power supply for controlling the control lines 21 and 23 to a predetermined potential.

Figure 4:
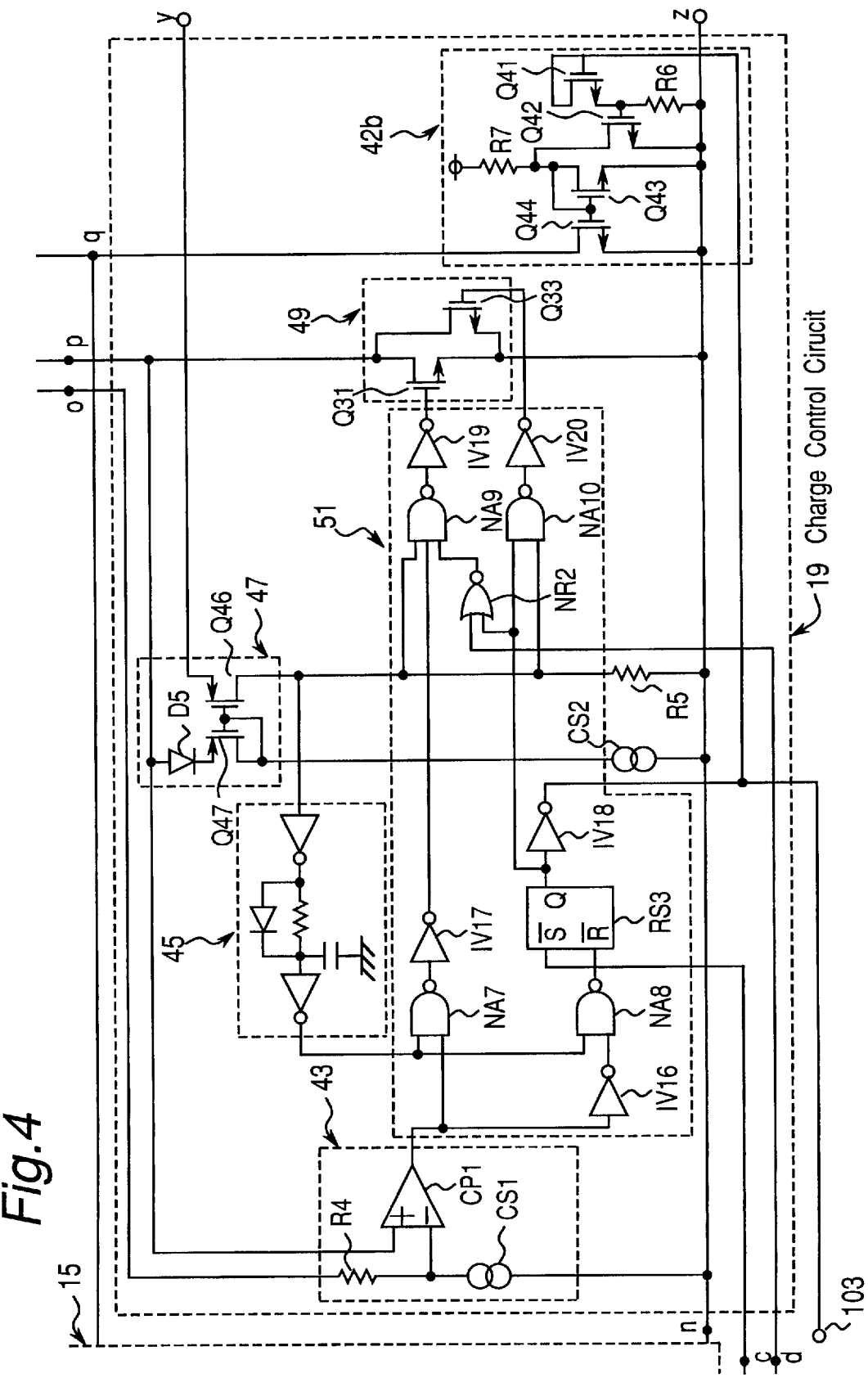
FIG. 4 is a circuit diagram of the charge control circuit shown in FIG. 1.

The charge control circuit 19 is described next with reference to FIG. 4.

The charge control circuit 19 controls charging the power supply capacitor C1, a task accomplished by means of a capacitor voltage monitor 43, a signal delay circuit 45, a predrive reference potential monitor 47, a constant current source CS2 for sweeping a small first charging current, a charging current circuit 49 for sweeping a second charging current that is greater than the first charging current, a control circuit 51 for controlling the charging current circuit 49, and a bypass control circuit 42*b*.

The capacitor voltage monitor 43 monitors the voltage at both ends of the power supply capacitor C1 by means of a comparator CP1, resistor R4, and constant current source CS1. The positive input of the comparator CP1 is connected to the low voltage side of the power supply capacitor C1 through node p, and the negative input is connected to a node between the resistor R4 and constant current source CS1.

The predrive reference potential monitor 47 monitors the reference potential of the predrive circuit 17 by means of p-channel MOSFETs Q46 and Q47, and diode D5. The gates of MOSFETs Q46 and Q47 are connected to a common node, and the cathode of the diode D5 is connected to the source of MOSFET Q47. The gate of MOSFET Q47 is connected to the drain. The anode of the diode D5 is connected to the low voltage side of the power supply capacitor C1 through node p, and the source of MOSFET Q46 is connected to the positive electrode of the control power source V2 through contact y. The drain of the MOSFET Q47, and the drain of MOSFET Q46, are connected to the negative electrode of the control power source V2 through constant current source CS2 and resistor R5, respectively.

The predrive reference potential monitor 47 is driven by means of constant current source CS2, and monitors the ground potential (low voltage side of the power supply capacitor C1) of the predrive circuit 17 with respect to the positive electrode voltage of the control power source V2 as the reference potential of the predrive circuit 17. The constant current source CS2 in this case sweeps a small current of approximately 100 μA. Note that the reference potential (low voltage side potential of the power supply capacitor C1) of the predrive circuit 17 changes according to the on/off operation of the power element.

The delay circuit 45 comprises inverters, a resistor, diode, and capacitor. The control circuit 51 comprises NAND gates NA7 to NA10, inverters IV16 to IV20, NOR gate NR2, and a latch circuit RS3.

The charging current circuit 49 comprises two parallel connected n-channel MOSFETs Q31 and Q33 of different sizes, and controls a second charging current. That is, MOSFET Q31 controls the second charging current to approximately 300 mA, and MOSFET Q33 to approximately 50 mA. The on/off states of the MOSFETs Q31 and Q33 are controlled according to a control signal from the control circuit 51.

The bypass control circuit 42*b* comprises resistors R6 ad R7, and n-channel MOSFETs Q41 to Q44, and in conjunction with bypass control circuit 42*a* controls the On/Off state of the bypass circuit 41 in the predrive circuit 17.

B. Control Signals

The control signals input to a PWM inverter output circuit thus comprised for controlling driving the power circuit 11 are described next below.

A motor free signal and a switching command signal are input to the input signal processor 13 through input terminal 101 and input terminal 102, respectively. The motor free signal is a control signal for setting the power circuit 11 to a free-run state in which both power elements P1 and P2 are off. The present embodiment is described here in as setting the power circuit 11 to a free-run state when the motor free signal goes low. The switching command signal is a control signal causing either power element P1 or P2 to switch on. When the switching command signal is low, the first power element P1 is off and the second power element P2 is on; when high, the first power element P1 is on and the second power element P2 is off.

C. Operation

The operation of a PWM inverter output circuit thus comprised is described next below.

When signals instructing power circuit 11 drive are input to the input signal processor 13 through input terminals 101 and 102, the input signal processor 13 generates a predetermined logic signal based on the input signals. Based on the output logic signal, the signal lines 25 and 27 of the level shift circuit 15 are set to a particular control state. The predrive circuit 17 then detects the control state of the signal lines 25 and 27, and controls the on/off state of the power elements P1 and P2 of the power circuit 11 by changing the potential of the control lines 21 and 23 based on the detected control state using the power supply capacitor C1 as a power source. A connection of the output terminal 104 is thus switched to either the positive or negative side of the main dc power source V1, and a desired PWM voltage is obtained. Charging the power supply capacitor C1 is controlled by the charge control circuit 19 during this time.

Driving the power circuit 11 during normal operation is described in further detail below. It should be noted that during normal operation the voltage of the control power source V2 and the charging voltage of the power supply capacitor C1 are assumed to be within a normal range.

D. Power Circuit Drive Control

The first case described below is that in which the first power element P1 of the power circuit 11 is off and the second power element P2 is on. The motor free signal at this time is high, and the switching command signal is low.

The control power monitor 33 of the input signal processor 13 outputs high because the voltage of the control power source V2 is in a normal range. A high is also input to input A of logic circuit 31 because the motor free signal is high, and a low is input to input B because the switching command signal is low. Referring to FIG. 5, output X of logic circuit 31 is low and output Y is initially high at this time. In the level shift circuit 15, therefore, transistor Q1 goes off and signal line 25 goes high, and transistor Q2 goes on and signal line 27 goes low. Note that while output Y is initially high, it goes low after a predetermined time. This predetermined time is longer than the time required for the control state to be latched by the latch circuits RS1 and RS2 after the logic circuit 31 first outputs.

The state detection circuit 34 of the predrive circuit 17 detects the state of signal lines 25 and 27 from the level shift circuit 15. That is, when the signal lines 25 and 27 are high and low, respectively, the NAND gate NA4 of state detection circuit 34 detects this state. The inputs to the NAND gate NA4 at this time are both high, resulting in a low output. The inputs to NAND gate NA3 are likewise both low, and the output therefrom is therefore high. The high state of signal line 25 also results in at least one high input to the NOR gate NR1 with the output therefrom going low. Note that the state of signal line 29 is determined here by bypass control circuits 42a and 42b, and is high during normal operation. This is described in further detail below.

The output signal from the state detection circuit 34 passes the filter circuits FL1 to FL3 and is applied to the latch circuits RS1 and RS2. The filter circuits FL1 to FL3 are used here for wave shaping and to remove noise introduced by the delay imposed by the logic gates of the state detection circuit 34. The filter circuit FL1 output is the inverted input thereto.

It should be noted that the amount of delay noise from the logic gates is extremely small and dissipates in an extremely short period of time, and therefore is not a problem in most cases. In such cases the filter circuits FL1 to FL3 can be eliminated. It will be obvious, however, that a part performing the function of the inverter in the ore filter circuit FL1 is needed to apply the required logic operation.

The insufficient voltage detector 35 outputs to the set input /S1 of the latch circuit RS1. When the charging voltage of the power supply capacitor C1 is within a normal range, the insufficient voltage detector 35 outputs high, resulting in a high at set input /S1. The output from NOR gate NR1 passes filter circuit FL1, resulting in a high at set input /S2 of latch circuit RS1. A low from NAND gate NA4 passed through filter circuit FL3 is applied to the reset input /R. The latch circuit RS1 is therefore reset, a high is output from output /Q.

A high is similarly passed from filter circuit FL2 to set input /S of latch circuit RS2, and a low is passed from filter circuit FL3 to reset input /R, thus causing the latch circuit RS2 to be reset, a high output from /Q, and a low output from Q. All inputs to NAND gate NA5 are thus high, resulting in a low output from NAND gate NA5 and a high input to switching elements Q11 and Q12 after passing inverters IV11 and IV12.

A low from output Q of latch circuit RS2 to NAND gate NA6 results in a high output from NAND gate NA6, and a low input to switching elements Q13 and Q14 after passing inverters IV13 and IV14. Thus switching elements Q12 and Q13 go on and become conductive, enabling the gate potential control line 21 and reference potential control line 23 to reach a predetermined potential by power from the power supply capacitor C1. More specifically, when switching elements Q12 and Q13 are conducting in this mode, the gate potential control line 21 goes low and the reference potential control line 23 goes high. The first power element P1 therefore switches off, and the second power element P2 switches on, in the power circuit 11.

The bypass circuit 41 parallel connected to the switching element Q13 is controlled by bypass control circuits 42a and 42b to be off during normal operation, and does not affect the operation described above. The operation of the bypass circuit 41 and bypass control circuits 42a and 42b is described later below.

When the first power element P1 switches off and the second power element P2 on as described above, the reference potential of the predrive circuit 17 also drops. Wren the reference potential of the predrive circuit 17 drops, the signal lines 25, 27, and 29 go momentarily high as a result of the floating capacitance on the signal lines. This is because the accumulated charge of the floating capacitance flows onto the signal lines. The state detection circuit 34, however, does not recognize the state in which all the signal lines 25, 27, and 29 are high, and misoperation of the predrive circuit 17 as a result of this floating capacitance is prevented.

Output Y of the logic circuit 31 in the input signal processor 13 goes from high to low as shown in FIG. 5 after a predetermined period of time, that is, after the control state defined by the motor free signal and switching command signal is latched by the latch circuits RS1 and RS2, and both outputs X and Y of the logic circuit 31 are thus low.

When both outputs X and Y of the logic circuit 31 are low, both MOSFETs Q1 and Q2 switch off, and current flow on signal lines 25 and 27 is cut off. As a result, controlling the power circuit 11 is not disabled even when both the input signal processor 13 and predrive circuit 17 are cut off. More specifically, cut off occurs after the control state defined by the motor free signal and switching command signal is stored by the latch circuits RS1 and RS2. As a result, the power circuit 11 can be continuously controlled according to the control state stored to the latch circuits RS1 and RS2 even when the predrive circuit 17 and input signal processor 13 are cut off.

A PWM inverter output circuit according to the present embodiment of the invention thus reduces power consumption by a MOSFET Q2 of the level shift circuit 15 by applying control information to the power circuit 11 as described above, passing this information to the predrive circuit 17 where the control state is stored, and then interrupting the current supply to the signal lines 25 and 27 carrying the control information.

Note, however, that power consumption by the MOSFET Q2 of the level shift circuit 15 is relatively low in this case, the power supply capacitor C1 is in a charging state (described later below), and there is no charge consumption. As a result, it is possible for MOSFET Q2 to remain on with current flowing to signal line 27. More specifically, output Y of the logic circuit 31 can remain high even after the specified period described above.

In the next case considered the first power element P1 is switched on and the second power element P2 off; the motor free signal and switching command signal are both high. Because both the motor free signal and control power monitor 33 output are high, a high is applied through inverter IV1 to input A of logic circuit 31 in the input signal processor 13, and a high is applied to input B. As shown in the truth table of FIG. 5, output X of the logic circuit 31 is therefore initially high, and output Y is low. Output X then goes low after a predetermined period to isolate the level shift circuit 15 from the control power source V2. MOSFET Q1 and MOSFET Q2 therefore go on and off, respectively, immediately after the output signals from the logic circuit 31 are output. This causes signal line 25 to go low and signal line 27 to go high in the level shift circuit 15.

The state detection circuit 34 of the predrive circuit 17 then detects the state of signal lines 25 and 27 by means of NAND gate NA3. That is, NAND gate NA3 outputs low because both inputs thereto are high; NAND gate NA4 outputs high because both inputs thereto are low; and NOR gate NR1 outputs low regardless of other inputs because signal line 27 is high.

A high is applied from the insufficient voltage detector 35 to set input /S1 of the latch circuit RS1, a high is applied from NOR gate NR1 through filter circuit FL1 to set input /S2, and a high is applied from NAND gate NA4 through filter circuit FL3 to the reset input /R. In this case, output /Q of latch circuit RS1 does not change, and the currently held state, that is, the state stored when first power element P1 switched off and second power element P2 switched on, is output from latch circuit RS1. More specifically, a high is output from output /Q of latch circuit RS1 in this case.

A low applied from NAND gate NA3 through filter circuit FL2 to set input /S causes latch circuit RS2 to be set and a low output from output /Q.

A low applied from output /Q of latch circuit RS2 to NAND gate NA5 of driver control circuit 36 results in a high output from the NAND gate NA5. The other NAND gate NA6 outputs low because a high input is applied thereto from the insufficient voltage detector 35, output /Q of latch circuit RS1, and output Q of latch circuit RS2. A low is therefore applied to switching elements Q11 and Q12 of the output driver circuit 37, and switching element Q11 becomes on. A high is also applied to switching elements Q13 and Q14, and switching element Q14 becomes on. The gate potential control line 21 is thus made high and the reference potential control line 23 low using the power supply capacitor C1 as a power source, and power elements P1 and P2 of the power circuit 11 switch on and off, respectively.

When the first power element P1 switches on and the second power element P2 off as described above, the reference potential of the predrive circuit 17 rises. When the reference potential of the predrive circuit 17 rises, the signal lines 25, 27, and 29 go momentarily low as a result of the floating capacitance on the signal lines. This is because a charging current flows from the signal lines to the floating capacitance. The state detection circuit 34, however, does not recognize the state in which all the signal lines 25, 27, and 29 are low, and misoperation of the predrive circuit 17 as a result of this floating capacitance is prevented.

As also described above, the signal lines 25 and 27 of the level shift circuit 15 are cut off by the logic circuit 31 after the control state is latched. As a result, power consumption by the MOSFET Q1 of level shift circuit 15, and consumption of the charge stored to the power supply capacitor C1, can be reduced when the power circuit 11 is driven.

Operation in a free-run state obtained by switching both power elements P1 and P2 off is described next.

The motor free signal in this case is low, a low is applied to input A of the logic circuit 31 in the input signal processor 13, and both outputs X and Y are high as indicated in FIG. 5. Both MOSFETs Q1 and Q2 become on, and the signal lines 25 and 27 become low. The signal line 29 is also high during normal operation as described above. The state detection circuit 34 of the predrive circuit 17 detects the state of signal lines 25, 27, and 29 by means of NOR gate NR1. That is, all inputs to the NOR gate NR1 are low, and the output therefrom is thus high. Both NAND gate NA3 and NA4 also output high. As a result, a high is applied to set input /S1 of latch circuit RS1, a low is applied to set input /S2, a high to reset input /R, latch circuit RS1 is set, and the output /Q goes low.

At least one input to NAND gates NA5 and NA6 of the driver control circuit 36 are therefore low, and both NAND gates output high. A low is therefore applied to switching elements Q11 to Q14 of the output driver circuit 37, switching elements Q11 and Q13 become on, gate potential control line 21 and reference potential control line 23 are controlled high, the gate-source voltage of power elements P1 and P2 in power circuit 11 goes to zero, and both power elements P1 and P2 turn off. A free-run state is thus achieved.

A PWM inverter output circuit according to the present embodiment can thus instantaneously provide protection for an attached motor or control device when some sort of trouble occurs, and can therefore assist in providing a safer system, by being able as described above to instantaneously effect a free-run state by turning switching elements Q11 and Q13 on.

Note, further, that by setting both control lines 21 and 23 high to achieve a free-run state, the power supply capacitor C1 can continue to be charged as will be described below while the free-run state is maintained. A free-run state in which the power supply capacitor C1 is not charged can also be achieved by setting both control lines 21 and 23 low.

As described above, a free-run state can be set by turning both power elements P1 and P2 off, resulting in the reference potential of the predrive circuit 17 either rising or dropping. In addition, the state of signal lines 25, 27, and 29 is affected by the floating capacitance on the signal lines, resulting in a momentary high state when the reference potential of the predrive circuit 17 drops, and a momentary low when the reference potential rises. However, as also described above, the state detection circuit 34 does not recognize either the all high or all low state of signal lines 25, 27, and 29, and operation of the predrive circuit 17 is thus not affected by any floating capacitance present.

As also described above, the signal lines 25 and 27 of level shift circuit 15 can be cut off by outputs X and Y of the logic circuit 31 going low after the control state is stored. As a result, power consumption by the MOSFET Q1 of level shift circuit 15, and consumption of the charge stored to the power supply capacitor C1, can be reduced when the power circuit 11 is driven.

As will be known from the above description, it is possible in a PWM inverter output circuit according to the present embodiment of the invention to control operation of the power elements P1 and P2 in the power circuit 11 based on a motor free signal and switching command signal.

E. Power Supply Capacitor Charging

Charging the power supply capacitor C1 is described next in detail below.

The power supply capacitor C1 is charged when the switching element Q13 of the output driver circuit 37 is on in a PWM inverter output circuit according to the present embodiment. The charging path of the power supply capacitor C1 at this time is indicated by the dotted arrow line in FIG. 6.

Figure 6:
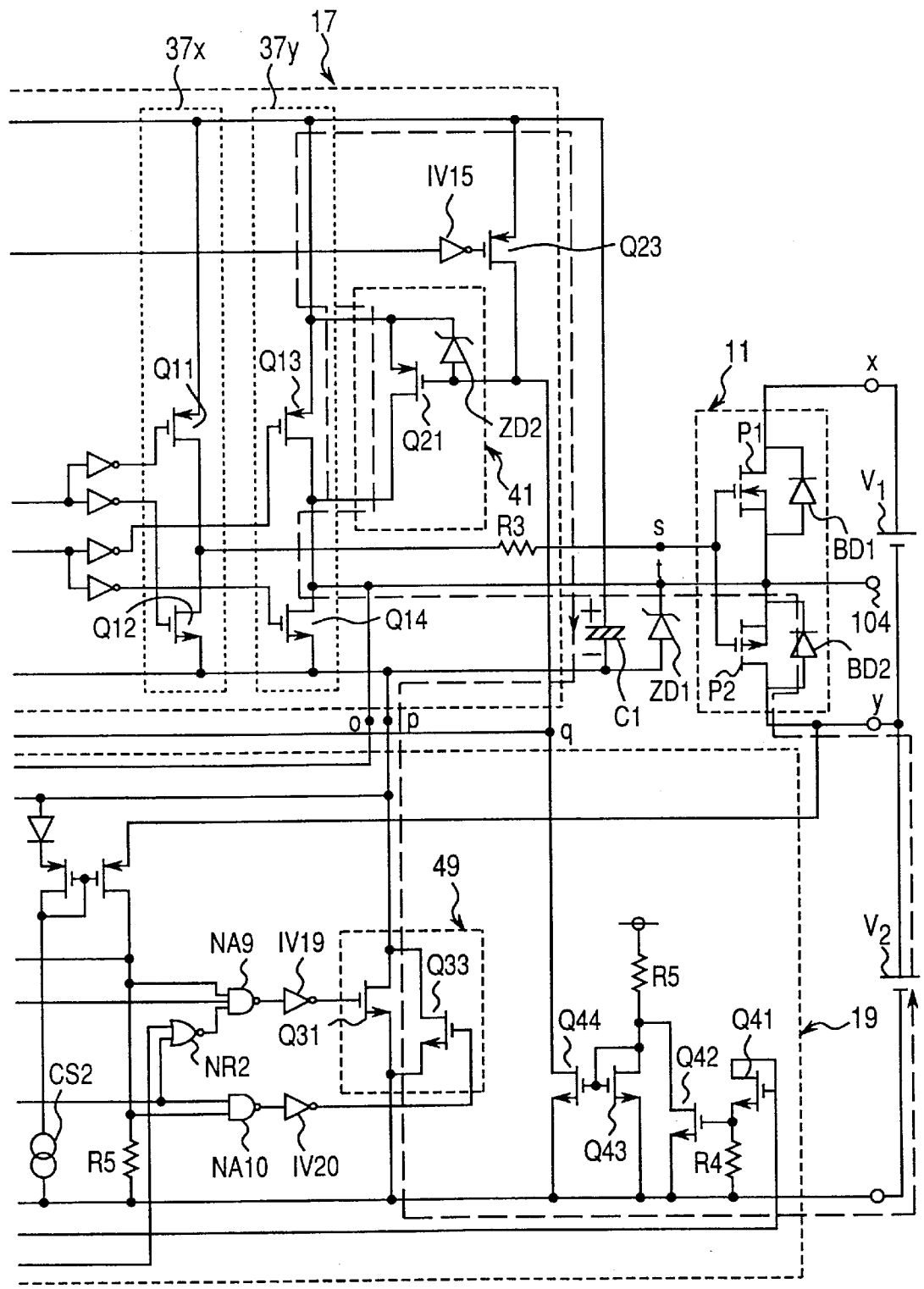
FIG. 6 is a circuit diagram to illustrate the charging path when charging the power supply capacitor shown in FIG. 1.

As shown in FIG. 6, the charging path travels from the positive electrode of the control power source V2 to the parasitic diode BD2 of the second power element P2, then through either bypass circuit 41 or switching element Q13 and to the power supply capacitor C1, from the power supply capacitor C1 to the charging current circuit 49, and back to the negative electrode of the control power source V2. Note that the parasitic diode BD2 of the second power element P2 may not be on based on the potential at each end of the second power element P2. In this case a charging current flows through output terminal 104, terminal y, and a winding of a different phase. In both cases, however, the charging current flows through the output contact 104 of the power circuit 11.

The charge control circuit 19 controls charging according to a plurality of charging modes, including an initial charging mode whereby the power supply capacitor C1 is charged at the start of operation, typically immediately after the power is turned on, and a refresh charging mode whereby the energy consumed during normal operation is replenished.

In the refresh charging mode, the power supply capacitor C1 must be rapidly charged during normal operation, and a stronger charging current is therefore used in comparison with the current used in the initial charging mode. The initial charging mode current is approximately 50 mA, and the refresh charging mode current is approximately 300 mA, in the present embodiment.

It should be noted that a strong current could be used in both the initial charging mode and refresh charging mode. To do this, however, a power supply capacitor C1 must be provided for each phase (U, V, W) of the motor, and the total charging current becomes momentarily very high because the charging current is supplied at the same time to the power supply capacitor C1 of each phase during the initial charging mode. The output power capacity (simply "output capacity" below) of the control power source V2 must therefore be increased, inviting both an increase in cost and an increase in the size of the control power source V2. To avoid these problems, the initial charging mode current is smaller than the refresh charging mode current in a PWM inverter output circuit according to the present embodiment.

F. Operation of Circuits in the Charge Control Circuit

The operation of the individual circuit components of the charge control circuit 19 is described next below.

During the bypass circuit 41 or switching element Q13 is on (described below), and the negative input of comparator CP1 of capacitor voltage monitor 43 is thus connected to the high voltage side of the power supply capacitor C1 through resistor R4. The positive input of comparator CP1 is also connected to the low voltage side of the power supply capacitor C1. A value dependent upon the voltage at each end of the power supply capacitor C1 is thus applied to the comparator CP1.

When the voltage at each end of the power supply capacitor C1 is greater than a predetermined voltage determined by resistor R4 and constant current source CS1, the comparator CP1 output goes low. The capacitor voltage monitor 43 can thus determine the charge state of the power supply capacitor C1 by monitoring the voltage of the power supply capacitor C1. When the charge is determined insufficient, the capacitor voltage monitor 43 output goes high; when the charge is sufficient, the output goes low.

The predrive reference potential monitor 47 monitors the absolute value of the reference potential of the predrive circuit 17, which rises and falls with the operation of the power elements P1 and P2, to determine if the absolute value of the reference potential drops below a predetermined value. Using the anode voltage of the diode D5 and the source voltage of the MOSFET Q47 as inputs, the predrive reference potential monitor 47 outputs the drain voltage of the MOSFET Q46. More specifically, the predrive reference potential monitor 47 outputs high when the equation $$Vi1 < Vi2 + Vf$$

is true where Vi1 is the voltage input from node p, Vi2 is the voltage input from node y, and Vf is the voltage drop of the diode D5 in the predrive reference potential monitor 47. When this equation is not true, the predrive reference potential monitor 47 output goes low.

The predrive reference potential monitor 47 thus outputs high when the reference potential of the predrive circuit 17 is less than or equal to a predetermined value, and outputs low when greater than said value. This predetermined value is determined by the value Vf of the diode voltage drop in the predrive reference potential monitor 47.

The delay circuit 45 functions as a synchronizer. That is, because of the delay introduced by the comparator CP1 of the capacitor voltage monitor 43, the delay circuit 45 delays the output signal from the predrive reference potential monitor 47 to synchronize this output signal with the output signal from the capacitor voltage monitor 43.

G. Operation in the Initial Charging Mode

The operation of the charge control circuit 19 during the initial charging mode is described below. Note that the power circuit 11 is controlled to the free-run state during this mode, and the switching elements Q11 and Q13 of the output driver circuit 37 are therefore on.

The bypass circuit 41 parallel connected to the switching element Q13 performs an important function during the initial charging mode. Operation of the bypass circuit 41 is therefore described first below before proceeding to the operation of the charge control circuit 19.

The switching elements Q11 to Q14 of the output driver circuit 37 are MOSFETs, and a parasitic diode is therefore formed between the drain and source of each MOSFET. When a reverse voltage is applied across the drain and source of the switching elements Q11 to Q14, the parasitic diode is conductive, completing a current path for a reverse current. The parasitic diode can be a cause of latch-up or misoperation, and it is therefore necessary to block the flow of current to the parasitic diode. The voltage between the terminals of the power supply capacitor C1 is low during the initial charging mode, and the switching element Q13 cannot be switched on until there is a certain rise in this voltage. It is therefore possible for the charging current to flow to the parasitic diode of the switching element Q13 during this time. The bypass circuit 41 is provided to prevent this current flow, and thus avoid the problems introduced by the parasitic diode.

The bypass circuit 41 is therefore on only during initial charging, thereby forming a bypass path parallel to the switching element Q13 and blocking charging current from flowing to the parasitic diode of the switching element Q13, The on/off state of the bypass circuit 41 is controlled by the bypass control circuits 42a and 42b.

The initial charging completion signal output through inverter IV18 by the control circuit 51 of the charge control circuit 19 is low during initial charging of the power supply capacitor C1. Note that the initial charging completion signal is low until initial charging is completed, and then goes high. As a result, both MOSFET Q41 and MOSFET Q42 of the bypass control circuit 42b are off during initial charging. MOSFET Q44 switches on when a high is applied to the gate thereof. Because the power supply capacitor C1 is not sufficiently charged at this time, the voltage is low at both ends of the power supply capacitor C1, and the insufficient voltage detector 35 outputs low.

MOSFET Q23 of bypass control circuit 42a switches off when a high is applied to the input thereof through the inverter IV15. This causes the signal line 29 to go low.

MOSFET Q21 of bypass circuit 41 switches on when a low is applied to the gate of MOSFET Q21, and a bypass path is formed parallel to the switching element Q13. The charging current thus flows through the bypass path formed by the bypass circuit 41 and not through the parasitic diode of the MOSFET Q13, and any effects of the parasitic diode can thus be avoided.

When the power supply capacitor C1 is sufficiently charged and the voltage at both ends of the power supply capacitor C1 rises to a sufficient level, the insufficient voltage detector 35 outputs high, and the MOSFET Q23 of the bypass control circuit 42a switches on. The initial charging completion signal also goes high, and MOSFET Q44 of bypass control circuit 42b switches off. The signal line 29 therefore goes high. The MOSFET Q21 thus cuts off, and the bypass path is closed.

As a result of the operation described above, the bypass circuit 41 and bypass control circuits 42a and 42b form an alternative path for the charging current around the MOSFET Q13 during the initial charging mode to prevent current conduction through the parasitic diode.

The operation of the charge control circuit 19 is described next below.

Initial charging is accomplished by turning the control power source V2 on. When the control power source V2 is on, the control power monitor 33 outputs low until the voltage rises to a predetermined level. A low is thus applied to the set input /S of latch circuit RS3, and output Q goes high. This high output from Q causes the NOR gate NR2 output to go low, the NAND gate NA9 output to go high, and the MOSFET Q31 of the charging current circuit 49 to switch off.

When the reference potential of the predrive circuit 17 drops sufficiently to approximately the positive electrode potential of the control power source V2, the predrive reference potential monitor 47 outputs high. A high is applied through latch circuit RS3 and predrive reference potential monitor 47 to the NAND gate NA10, which thus outputs low. The MOSFET Q33 of charging current circuit 49 therefore switches on.

When the reference potential of the predrive circuit 17 has not dropped sufficiently, the predrive reference potential monitor 47 outputs low, and the MOSFET Q33 switches off. This suppresses loss from MOSFET Q33 of charging current circuit 49 during the initial charging mode.

As described above, therefore, MOSFET Q31 of charging current circuit 49 switches off and MOSFET Q33 switches on when the reference potential of the predrive circuit 17 drops sufficiently during initial charging. As a result, a charging path is formed from the control power source V2 to the parasitic diode BD2 of second power element P2 (or other phase winding), to the bypass circuit 41, the power supply capacitor C1, MOSFET Q33 of charging current circuit 49, and then to the negative side of the control power source V2.

The constant current source CS2 sweeps a small current for driving the predrive reference potential monitor 47. The small current makes a further charging path from the positive side of the control power source V2 to the parasitic diode BD2 of second power element P2 (or other phase winding), to the bypass circuit 41, the power supply capacitor C1, predrive reference potential monitor 47, constant current source CS2, and then to the negative side of the control power source V2. As a result, the power supply capacitor C1 is charged by both an approximately 50 mA charging current from the MOSFET Q33, and a small approximately 100 $\mu$A current from the constant current source CS2. When the reference potential of the predrive circuit 17 has not dropped, the approximately 50 mA charging current from the MOSFET Q33 is cut off to suppress loss from the MOSFET Q33. The small approximately 100 $\mu$A current continues to flow from the constant current source CS2, however, and charging of the power supply capacitor C1 can thus be sustained, though at a very low level.

Though slight, the constant current source CS2 also sweeps current from the predrive circuit 17, and thereby accelerates the drop in the reference potential of the predrive circuit 17. As a result, the constant current source (S2 also functions to advance the output timing of the approximately 50 mA charging current from the MOSFET Q33.

The charge control circuit 19 passes the output from latch circuit RS3 through inverter IV18 to output terminal 103 as the initial charging completion signal of the PWM inverter output circuit of the present invention. Output Q of latch circuit RS3 is high as described above during the initial charging mode. When initial charging is completed, and the voltage of power supply capacitor C1 rises to a predetermined level or greater, the capacitor voltage monitor 43 output goes low. As a result the reset input /R of latch circuit RS3 goes low, and output Q goes low. In other words, the initial charging completion signal is low until initial charging is completed, and then goes high when charging is completed. By making this initial charging completion signal available to equipment external to the PWM inverter output circuit, attached equipment can be driven safely.

Note also that by output Q of the latch circuit RS3 going low when initial charging is completed, MOSFET Q33 switches off and one input to the NOR gate NR2 goes low so that the refresh charging operation described below can be performed.

H. Refresh Charging Operation

The operation of the charge control circuit 19 during the refresh charging mode is described next.

Three conditions are required for charging to start in the refresh charging mode as follow.

(1) A control state causing second power element P2 to switch on must be output from the input signal processor 13 (switching elements Q12 and Q13 must be on).

(2) The reference potential of the predrive circuit 17 must have dropped to a predetermined level or below. (The reference potential of the predrive circuit 17 does not drop instantaneously when the power elements P1 and P2 are switched based on the control state supplied from the input signal processor 13 because of the operating delay in the predrive circuit 17 and the on/off delay time of the power elements P1 and P2. It is therefore necessary to wait for the reference potential to drop sufficiently.)

(3) The voltage at both ends of the power supply capacitor C1 must drop to a predetermined level or below (an insufficient charge).

Refresh charging is possible when the above three conditions are satisfied.

In order for refresh charging to start, therefore, the motor free signal must be high and the switching command signal low to satisfy condition (1) above, the output from predrive reference potential monitor 47 must be high because of condition (2), and the output of capacitor voltage monitor 43 must be high because of condition (3).

In the refresh charging mode, the voltage of control power source V2 is within a normal range, and the control power monitor 33 of input signal processor 13 outputs high. The NAND gate NA1 outputs low. Both inputs to NAND gate NA2 are therefore high, and the output is thus low. The output from capacitor voltage monitor 43 is inverted by inverter IV16 of the charge control circuit 19 to apply a low to NAND gate NA8, and the output from the predrive reference potential monitor 47 passed through the delay circuit 45 is high at NAND gate NA8, resulting in a high output therefrom. A high is applied from the control power monitor 33 to set input /S of latch circuit RS3, and a high is applied from NAND gate NA8 to reset input /R. Output Q of latch circuit RS3 therefore does not change, and the latched data is output as stored. Output Q goes low at this time for the reasons described below.

The output from the control power monitor 33 is applied to the set input /S of the latch circuit RS in control circuit 51 of the charge control circuit 19. As a result, the latch circuit RS3 is set when the control power source V2 is turned on, or when a voltage deficiency is detected when a problem occurs. The latch circuit RS3 is therefore set during normal operation, and the output Q does not go from low to high. The latch circuit RS3 is reset at the completion of initial charging as described above, and output Q goes low. As a result, once initial charging is completed and the latch circuit RS3 is reset, the latch circuit RS3 is not set again during normal operation, and output Q remains low.

Because the latch circuit RS3 thus outputs low, the NAND gate NA10 output goes high, and MOSFET Q33 switches off. A high is applied to NAND gate NA7 from the predrive reference potential monitor 47 via the capacitor voltage monitor 43 and the delay circuit 45, causing NAND gate NA7 to output low. A low from latch circuit RS3 and a low from the NAND gate NA2 of input signal processor 13 applied to the NOR gate NR2 result in a high output therefrom. All inputs to the NAND gate NA9 of control circuit 51 are therefore high, and the output is thus low. A high applied to the MOSFET Q31 of charging current circuit 49 causes MOSFET Q31 to switch on.

The charge stored to the power supply capacitor C1 is thus refreshed during normal operation based on the three conditions described above. Note that MOSFET Q31 is on and MOSFET Q33 is off in the charging current circuit 49 at this time. As a result, a charging path is formed from the control power source V2 to the parasitic diode BD2 of second power element P2 (or other phase winding), to switching element Q13, power supply capacitor C1, and MOSFET Q31. A charging current of approximately 300 mA, i.e., a current greater than the approximately 50 mA charging current used during initial charging, is supplied at this time by the MOSFET Q31, and the charge from power supply capacitor C1 consumed during normal operation can be immediately recovered.

A PWM inverter output circuit according to the present embodiment can thus rapidly charge a power supply capacitor C1 used for supplying the drive power source during normal operation, and can optimize the output capacity of the control power source V2, by appropriately switching operation of power elements P1 and P2 according to an initial charging mode used before operation starts, and a refresh charging mode used during normal operation, to supply a charging current during the refresh charging mode that is greater than the charging current used for the initial charging mode.

Charging in a free-run state during initial charging is also possible, thereby enabling safe starting even when an electromotive force is present in the motor winding.

It should be noted that while a MOSFET Q33 for initial charging, and a MOSFET Q31 for refresh charging, are separately provided in the charging current circuit 49, these can be combined in a single MOSFET while achieving the same operation and effects. More specifically, when a single MOSFET is used for both devices, a first voltage of a level causing a current of approximately 50 mA to flow from the MOSFET is applied to the gate during initial charging, and a second voltage of a level greater than the first voltage is applied to the gate during refresh charging to cause a current of approximately 300 mA to flow. It will be obvious that when the charging current circuit 49 comprises a single MOSFET as thus described, additional benefits of lower cost and smaller chip size can be achieved during circuit integration.

Furthermore, by providing a capacitor voltage monitor 43 and charging the power supply capacitor C1 only when the end voltages thereof drop below a predetermined level, the charging control operation of a PWM inverter output circuit according to the present embodiment can prevent overcharging the power supply capacitor C1 and reduce charging loss in addition to stabilizing the voltage between the power supply capacitor terminals.

Yet further, loss by the charging current circuit 49 can be reduced, and charging loss can be further suppressed, as a result of providing a predrive reference potential monitor 47 and starting charging when the reference potential of the predrive circuit 17 drops a sufficient amount.

I. Benefits of Providing a Zener Diode

As shown in FIG. 1, the PWM inverter output circuit according to the present embodiment comprises a Zener diode ZD1 with the anode thereof connected to the low voltage side of the power supply capacitor C1, and the cathode connected to the high voltage side of the power supply capacitor C1 by way of switching element Q13. This Zener diode ZD1 prevents an excessive voltage rise during power supply capacitor C1 charging. That is, bypass circuit 41 or switching element Q13 is on during charging, the high voltage potential of the power supply capacitor C1 and the cathode potential of the Zener diode ZD1 become equal. As a result, if the voltage at both ends of the power supply capacitor C1 rises excessively, the Zener diode ZD1 conducts in the reverse direction to clamp the end voltages of the power supply capacitor C1 and prevent an excessive voltage rise.

Note that the cathode of the Zener diode ZD1 is connected through the switching element Q13 because the energy stored to the power supply capacitor C1 will leak from the Zener diode ZD1 during non-charging periods if the Zener diode ZD1 is parallel connected to the power supply capacitor C1. By connecting the Zener diode ZD1 through the switching element Q13 to the power supply capacitor C1 as described above, however, current leakage from the Zener diode ZD1 can be prevented, and the end voltages of the power supply capacitor C1 can be clamped.

J. Countermeasures for Parasitic Diodes

Figure 8:
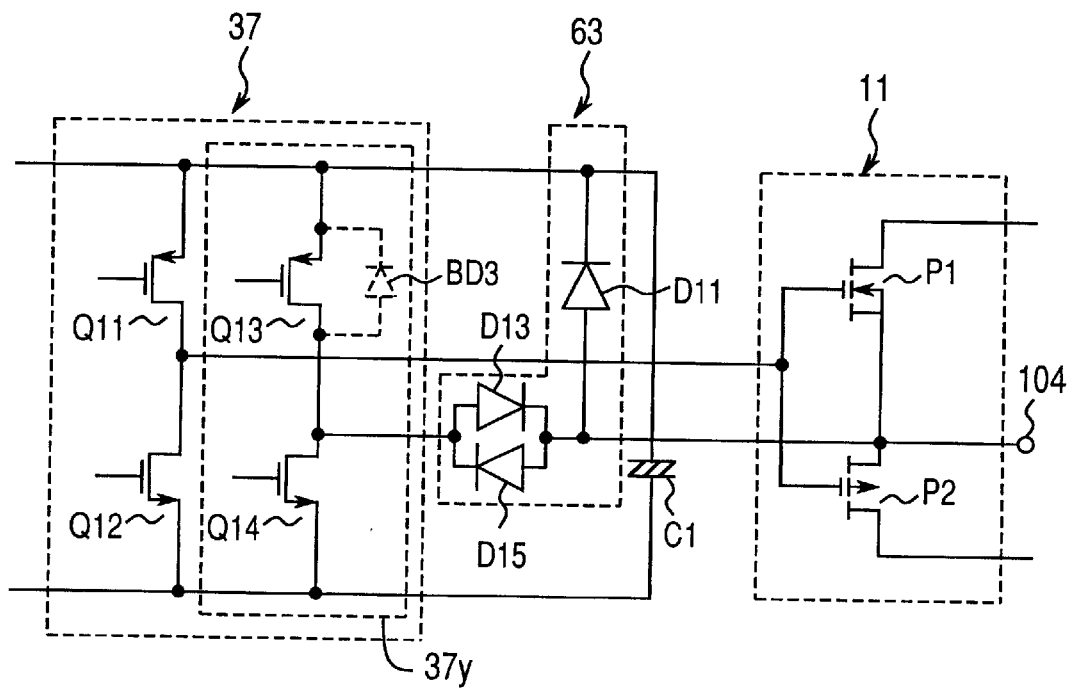
FIG. 8 is a circuit diagram of a second exemplary circuit for preventing the effects of a parasitic diode in the PWM inverter output circuit shown in FIG. 1.
Figure 9:
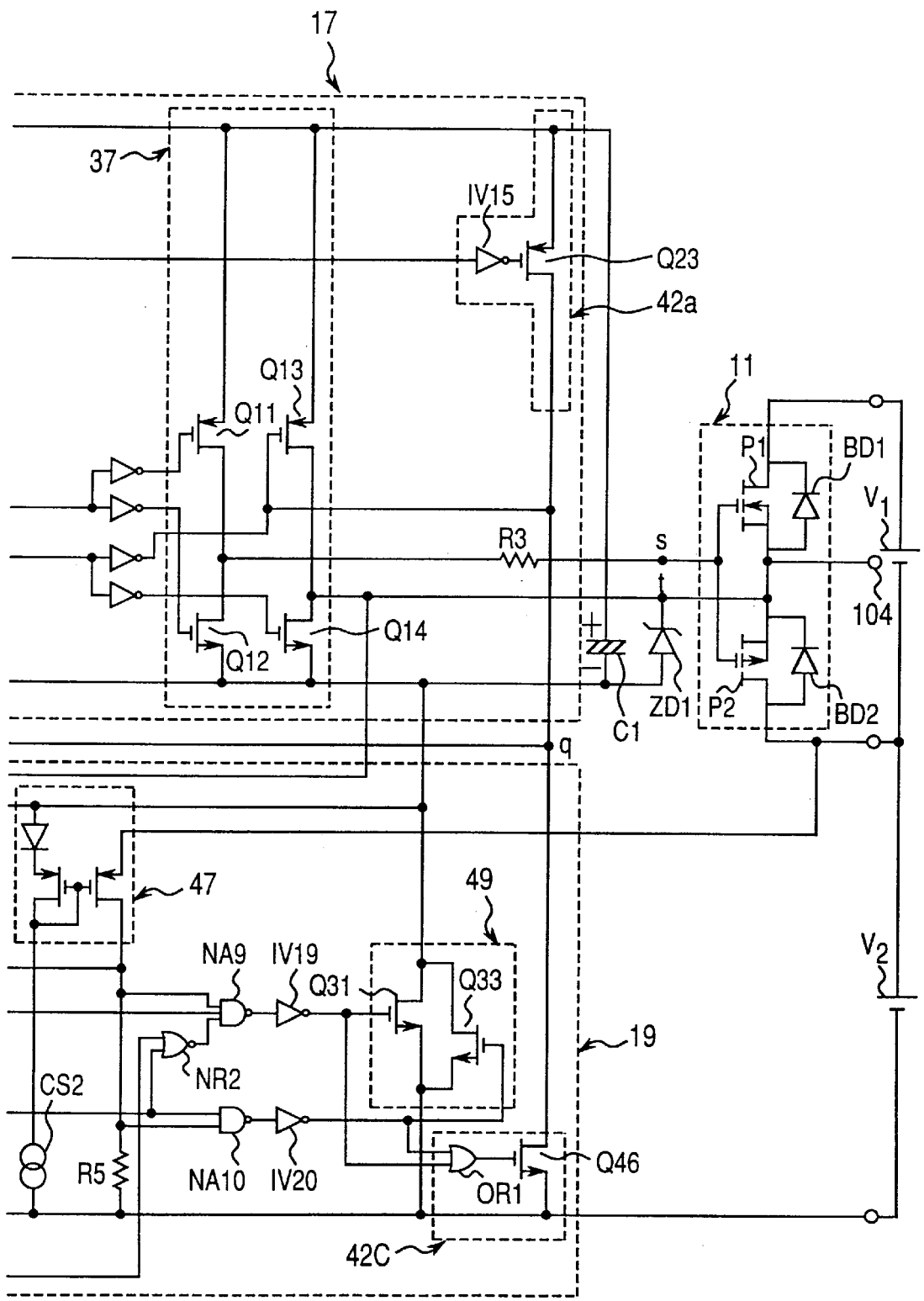
FIG. 9 is a circuit diagram of a third exemplary circuit for preventing the effects of a parasitic diode in the PWM inverter output circuit shown in FIG. 1.

As described above, the bypass circuit 41 and bypass control circuits 42*a* and 42*b* prevent the effects of a parasitic diode during initial charging. By making the switching element Q13 fully on during normal operation after initial charging is completed, the switching element Q13 rather than the bypass circuit 41 functions as the charging path. When the switching element Q13 cannot be switched on because the end voltages of the power supply capacitor C1 have dropped for some reason, however, it is still necessary to prevent the adverse effects of the parasitic diode. An exemplary circuit for accomplishing this is described next below with reference to FIG. 7 to FIG. 9. Note that for convenience of description, only the circuits of the part relevant to this parasitic diode countermeasure are shown in FIG. 7 to FIG. 9.

Figure 7:
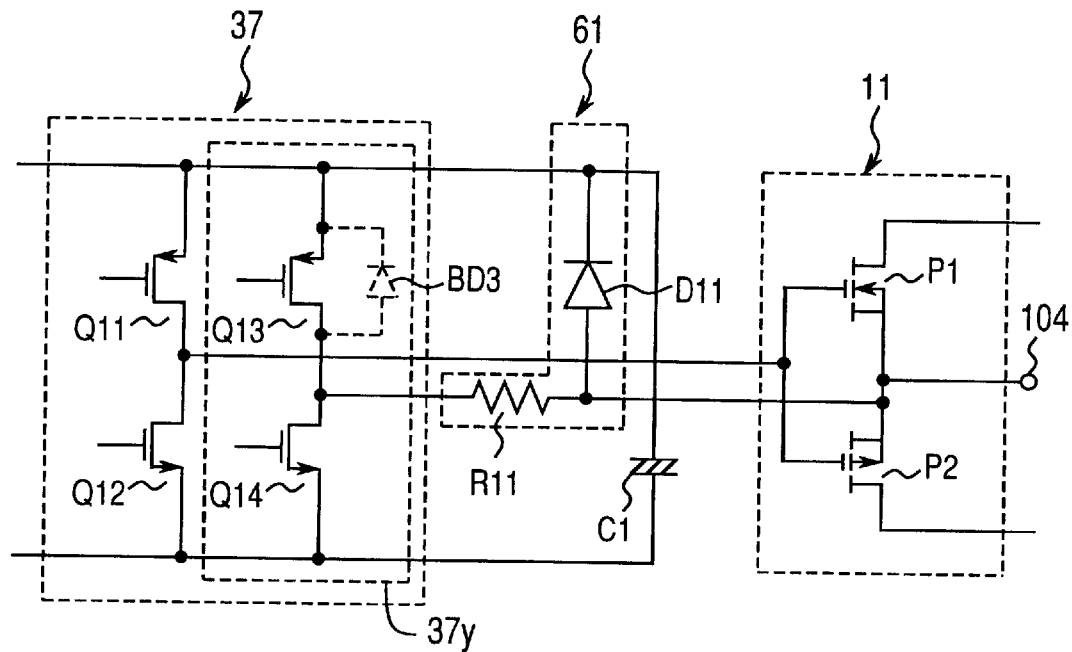
FIG. 7 is a circuit diagram of a first exemplary circuit for preventing the effects of a parasitic diode in the PWM inverter output circuit shown in FIG. 1.

A first exemplary circuit is shown in FIG. 7 where part of the predrive circuit 17, the power circuit 11, and a parasitic prevention circuit 61 are shown. Note that the parasitic prevention circuit 61 is provided additionally to the bypass circuit 41 and bypass control circuit 42a of the predrive circuit 17 shown in FIG. 3, and the bypass control circuit 42b of the charge control circuit 19 shown in FIG. 4.

As shown in FIG. 7, the parasitic prevention circuit 61 comprises a diode D11, and a resistor R11 connected in series to the anode of the diode D11. This series circuit of resistor R11 and diode D11 is parallel connected to the switching element Q13, and a node between the resistor R11 and diode D11 is connected to the common source of the power elements P1 and P2.

With this configuration, the charging current passing through the output terminal of the power circuit 11 does not flow toward parasitic diode BD3 while refreshing the charge to the power supply capacitor C1 because of the large voltage drop at resistor R11, and a charging path is formed whereby the charging current flows instead to diode D11 and does not pass the parasitic diode BD3. As a result, the effects of a parasitic diode on refresh charging mode operation are avoided.

While a small current of approximately 100 μA is constantly emitted from the constant current source CS2, it is possible for this small current to flow to the parasitic diode BD3 if the voltage drop of the resistor R11 is not sufficient. This can be avoided, however, by operating the bypass circuit 41 when there is a voltage drop at both ends of the power supply capacitor C1. For the bypass circuit 41 to operate when there is a voltage drop at both ends of the power supply capacitor C1, the MOSFETs Q41 and Q42, and resistor R6 can be removed. In addition, when the voltage at both ends of the power supply capacitor C1 is normal, the large refreshing charging current flow through the diode D11 and not the switching element Q13. As a result, the device size of the switching element Q13 can be reduced a corresponding amount, and the circuit size can be further reduced accordingly.

A second exemplary circuit is shown in FIG. 8. Note that the parasitic prevention circuit 63 shown in FIG. 8 comprises a parallel circuit of diode D13 and diode D15 connected in opposite directions in place of the resistor R11 used in the parasitic prevention circuit 61 shown in FIG. 7. In this circuit, the charging path is a channel from the output terminal 104 of the power circuit 11 and including the diode D11. This is because a path of only diode D11 has fewer diodes than a path using diode D15 and parasitic diode BD3, and current flows more easily. Note that during normal operation, current flows through the diode D13 and diode D15 to control the source potential of the power elements P1 and P2.

Note that with the circuit configuration shown in FIG. 8 the entire charging current, including the small current from the constant current source CS2, flows through the diode D11, and the parasitic diode BD3 is therefore never conductive. As a result, the bypass circuit 41 and bypass control circuits 42a and 42b can be eliminated by using the parasitic prevention circuit 63 shown in FIG. 8.

Detecting the conditions under which charging starts is simplified by using a parasitic prevention circuit as shown in FIG. 7 or FIG. 8, and charging control free of the problems introduced by a parasitic diode can be achieved using a simpler circuit configuration.

There is also a method of preventing similar parasitic effects by connecting a Schottky barrier diode with a small forward voltage parallel to the parasitic diode BD3. The problem with a Schottky barrier diode, however, is that the leakage current in the reverse direction is great. As a result, using a Schottky barrier diode for parasitic prevention results in a large leakage current flowing through the Schottky barrier diode when the switching element Q14 is on, thus accelerating a drop in the voltage at both ends of the power supply capacitor C1.

It should therefore be noted that a common silicon diode with a small reverse leakage current can be used as diode D11 to achieve a parasitic prevention circuit as shown in FIG. 7 or FIG. 8. Unlike what happens if a Schottky barrier diode is used, current leakage does not cause a drop in the end voltages of the power supply capacitor C1.

A third exemplary circuit is shown in FIG. 9. Note that the device shown in FIG. 9 uses a bypass control circuit 42c in place of the bypass circuit 41 in the predrive circuit 17 (FIG. 3) and the bypass control circuit 42b of the charge control circuit 19 (FIG. 4).

This bypass control circuit 42c comprises an OR gate OR1 and an n-channel MOSFET Q46. The outputs from inverter IV19 and inverter IV20 are applied to the OR gate OR1, and the output of the OR gate OR1 is applied to the gate of the MOSFET Q46. The source of the MOSFET Q46 is connected to the negative side (ground line) of the control power source V2, the drain of the MOSFET Q46 is common with the drain of the MOSFET Q23 in the bypass control circuit 42a through a node between the MOSFET Q23 and the MOSFET Q46 connected to the gate of switching element Q13.

Thus comprised, the MOSFET Q46 switches on when either MOSFET Q31 or MOSFET Q33 of the charging current circuit 49 is on, thereby causing the switching element Q13 to switch on. Because the switching element Q13 is also conductive in the reverse direction when on, the charging current passes the switching element Q13 and not the parasitic diode during charging, and the undesirable effects introduced by the parasitic diode can be avoided.

It should be noted that the performance of the power supply capacitor C1 drops as a result of use over an extended period. Therefore, the exemplary circuit shown in FIG. 9 is effective when the terminal voltages of the power supply capacitor C1 do not rise sufficiently and the switching element Q13 cannot form a charging path.

K. Alternative Version of a Power Circuit

As described above, the first power element P1 connected to the high voltage side of the power circuit 11 is an n-channel MOSFET, and the second power element P2 connected to the low voltage side is a p-channel MOSFET. The power circuit 11 of the present invention shall not be so limited, however, and various other configurations are possible. An exemplary alternative version of the power circuit 11 is described next with reference to FIG. 10 and FIG. 11.

Figure 10:
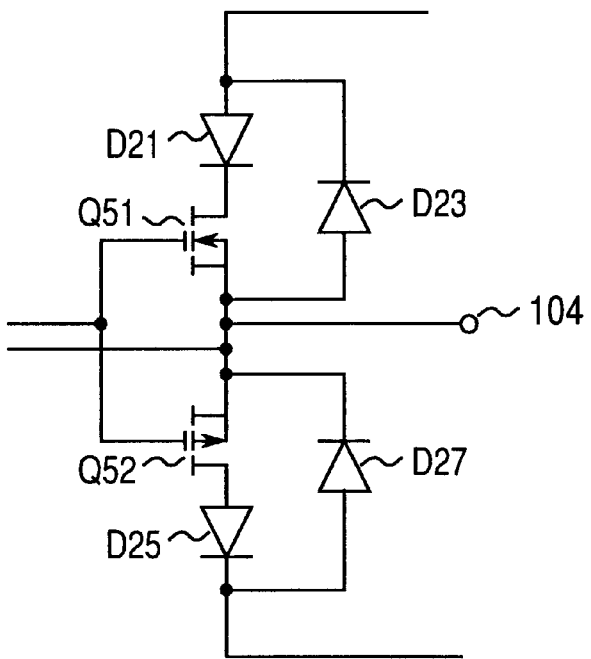
FIG. 10 is a circuit diagram of a first alternative version of the power elements in the power circuit in the PWM inverter output circuit shown in FIG. 1.

In the power circuit shown in FIG. 10, the first power element comprises a serial circuit having an n-channel MOSFET Q51 and a diode D21, with another diode D23 parallel connected to this series circuit. The diode D21 is oriented in the forward direction to MOSFET Q51, and diode D23 is oriented in the reverse direction.

The second power element similarly comprises a serial circuit having a p-channel MOSFET Q52 and diode D25, and another diode D27 parallel connected thereto. The diode D25 in this case is oriented in the forward direction to the MOSFET Q52, and the diode D27 is oriented in the reverse direction.

By thus configuring the power circuit, conducting by the parasitic diodes of MOSFET Q51 and Q52 is prevented, and reverse current flow is rerouted by the diodes D23 and D27.

The reverse recovery time of a power MOSFET parasitic diode is generally slow, and when the reverse recovery time is slow, switching loss and noise increase during PWM control. While power MOSFETs having a parasitic diode with a fast reverse recovery time have been developed with recent advances in semiconductor technologies, the power circuit shown in FIG. 10 is useful when switching loss and noise are a problem.

Figure 11:
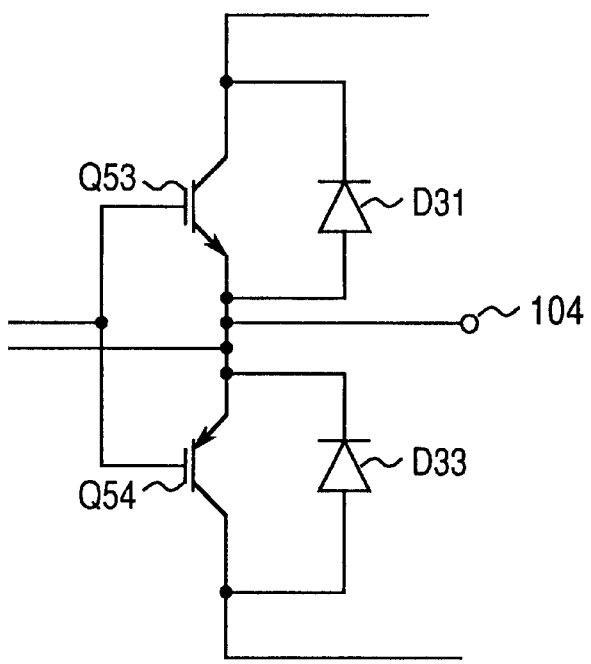
FIG. 11 is a circuit diagram of a second alternative version of the power elements in the power circuit in the PWM inverter output circuit shown in FIG. 1.

In a further exemplary power circuit as shown in FIG. 11, the first power element comprises an n-channel insulated gate bipolar transistor (IGBT) Q53, and a diode D31 parallel connected thereto with the direction of current flow reversed relative to the IGBT Q53.

The second power element similarly comprises a p-channel insulated gate bipolar transistor (IGBT) Q54, and a diode D33 parallel connected thereto with the direction of current flow reversed relative to the IGBT Q54.

A PWM inverter output circuit with higher output can be achieved by thus using configuring the power circuit with IGBT elements having a higher current output capacity than MOSFET elements.

(Embodiment 2)

A PWM inverter output circuit according to the first embodiment of the present invention as described above uses n-channel MOSFETs and p-channel MOSFETs for the power elements, and controls the on and off states of these power elements using the same control signal. Thus, the PWM inverter output circuit according to the first embodiment is suitable for use with a power circuit that can be driven with zero dead time.

A PWM inverter output circuit according to the second embodiment described below, however, uses a pair of n-channel MOSFETs in the power circuit, and controls MOSFET operation with separate control signals.

A. Circuit Configuration

Figure 12:
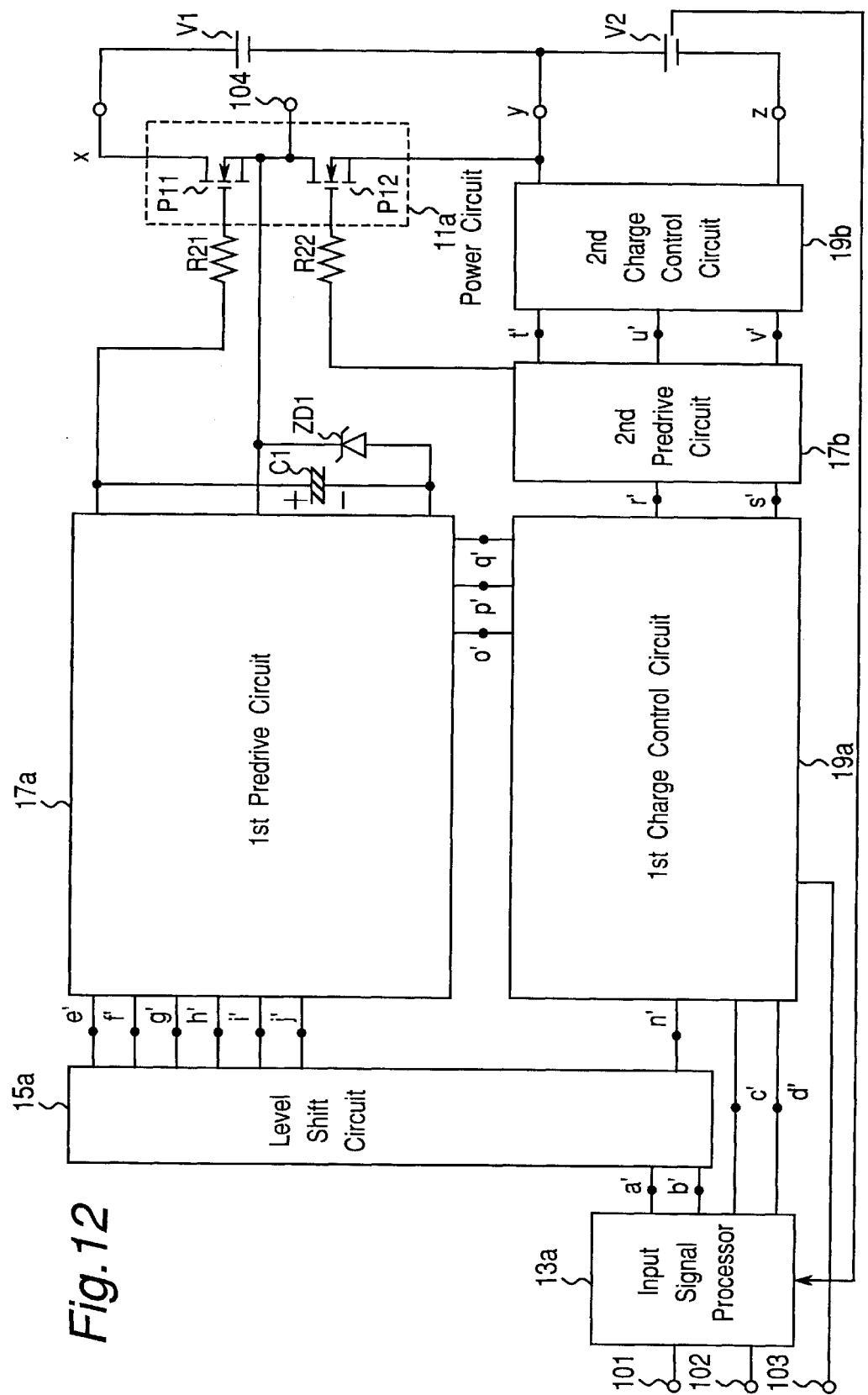
FIG. 12 is a block diagram of a PWM inverter output circuit according to a second embodiment of the present invention.

FIG. 12 is a block diagram of a PWM inverter output circuit according to the present embodiment of the invention. As shown in FIG. 12, this PWM inverter output circuit comprises a power circuit 11a having a first power elements P11 and a second power elements P12 for outputting a drive voltage to a motor; an input signal processor 13a to which control information for controlling the power circuit 11a is input; a level shift circuit 15a for setting a signal line carrying the control information to a predetermined control state based on the supplied control information; a first predrive circuit 17a for controlling driving the first power element P11 of the power circuit 11a based on a predetermined control state; a second predrive circuit 17b for controlling driving the second power element P12 of the power circuit 11a based on a predetermined control state; a power supply capacitor C1 used as the power source for driving first power element P11; a first charge control circuit 19a for controlling charging the power supply capacitor C1; a second charge control circuit 19b for charging a power for driving the second power element P12 in the second predrive circuit 17b; a main dc power source V1 for supplying an output voltage; and a control power source V2 for supplying power for driving the overall circuitry of the PWM inverter output circuit.

These elements of the PWM inverter output circuit are described in further detail below.

As shown in FIG. 12, the power circuit 11a comprises a pair of the first power element P11 and the second power element P12 where both power elements are n-channel MOSFETs. The drain of the first power element P11 is connected to the positive side of the main dc power source V1, and the source is connected to the drain of second power element P12. The source of the second power element P12 is connected to the negative side of the main dc power source V1. A parasitic diode (not shown in the figures) is present between the source and drain of the MOSFET power elements P11 and P12.

Figure 13:
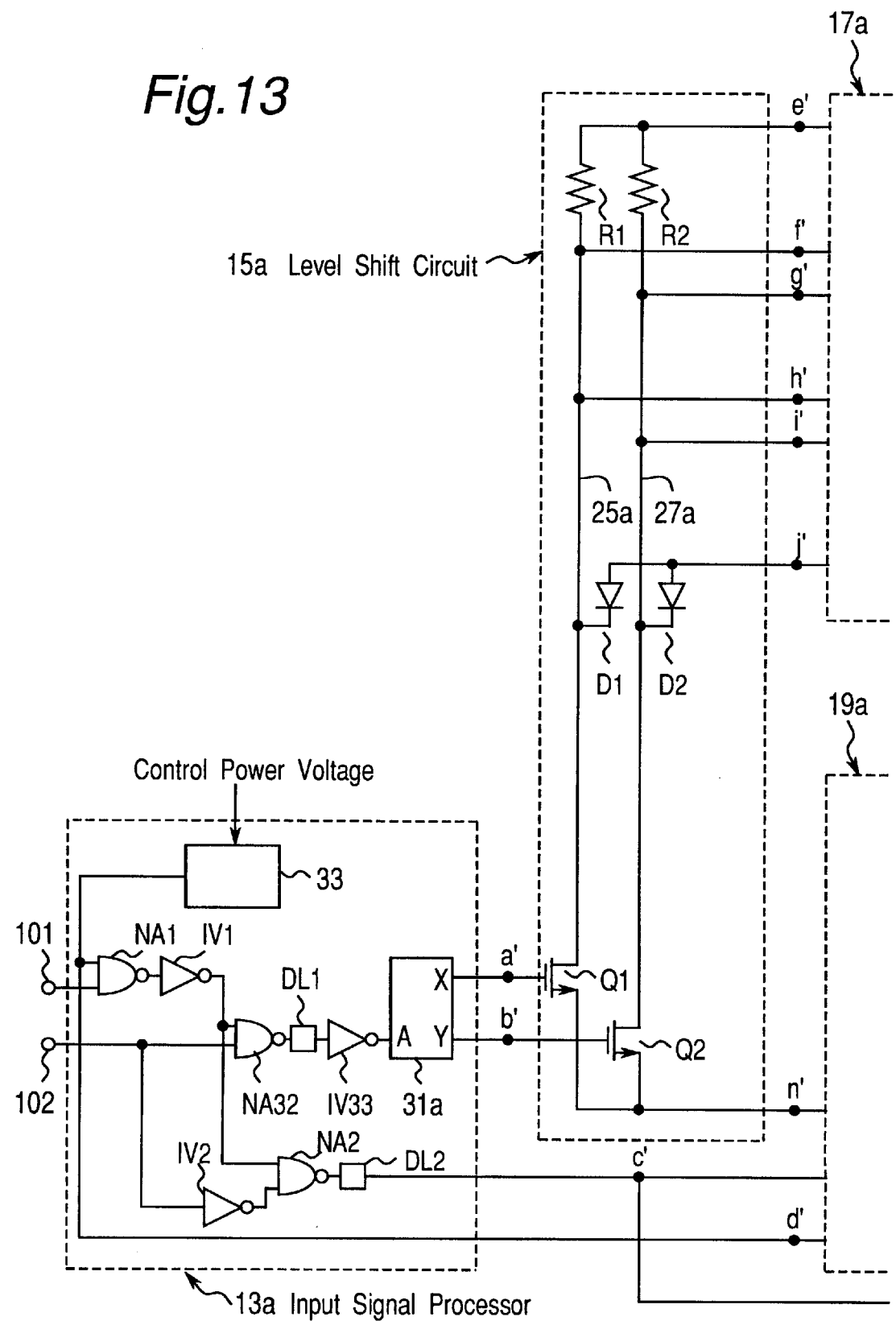
FIG. 13 is a circuit diagram of the input signal processor and level shift circuit of the PWM inverter output circuit shown in FIG. 12.

Schematic diagrams of the input signal processor 13a and level shift circuit 15a are shown in FIG. 13. As shown in the figure, the input signal processor 13a comprises NAND gates NA1, NA2, and NA32, inverters IV1, IV2, and IV33, logic circuit 31a, delay circuits DL1 and DL2, control power monitor 33.

The control power monitor 33 is the same as that of the first embodiment described above.

Figure 17:
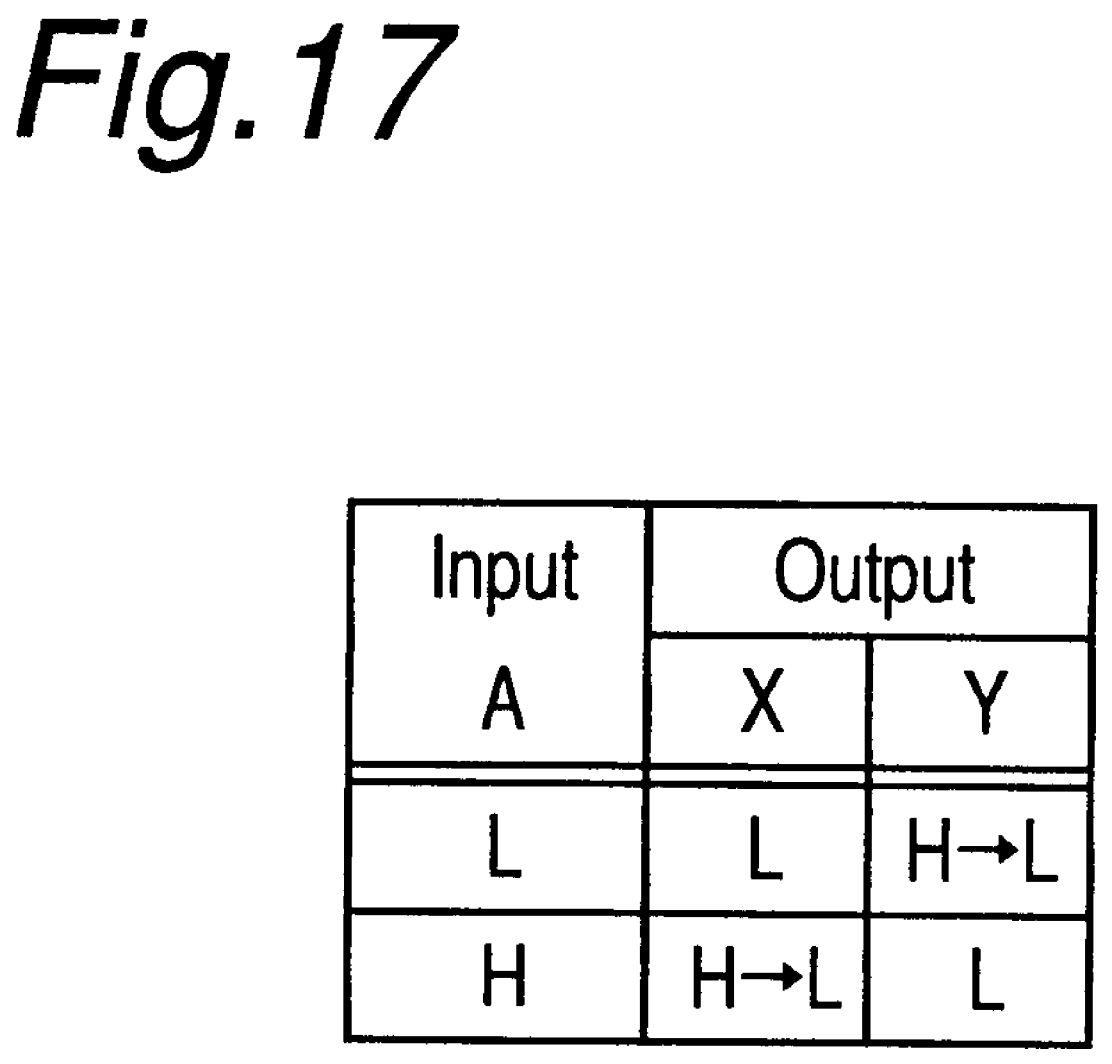

The logic circuit 31 has input A and outputs X and Y, and operates according to a truth table such as shown in FIG. 17.

The input signal processor 13a has input terminals 101 and 102. Control information for the power circuit 11a is supplied through the input terminals 101 and 102. A motor free signal is applied to input terminal 101, and the switching command signal is applied to input terminal 102.

The level shift circuit 15a comprises signal lines 25a and 27a; resistors R1 and R2; MOSFETs Q1 and Q2; and diodes D1 and D2. Resistor R1 and n-channel MOSFET Q1 are connected in series to signal line 25a, and resistor R2 and n-channel MOSFET Q2 are connected in series to signal line 27a.

Signal lines 25a and 27a are connected between the high voltage side of the predrive circuit 17a at one end after passing resistors R1 and R2, respectively, and a ground line from which the reference potential of the PWM inverter output circuit is supplied at the other end after passing MOSFETs Q1 and Q2, respectively. As a result, when the MOSFETs Q1 and Q2 are off, signal lines 25a and 27a are high. When MOSFETs Q1 and Q2 are on, the signal lines 25a and 27a go low.

Note that the diodes D1 and D2 shown in FIG. 13 perform the same function as described in the first embodiment.

Figure 14:
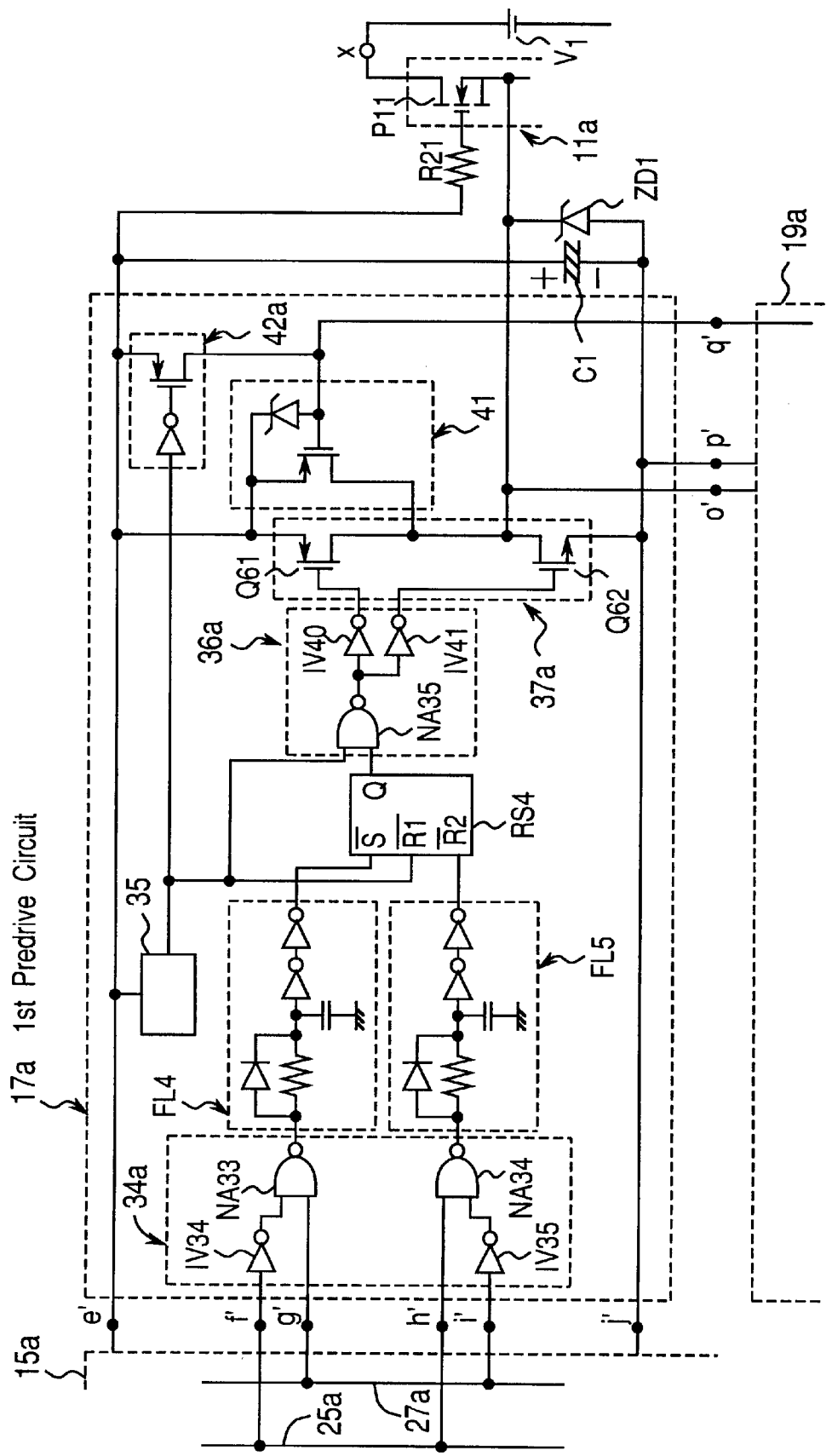
FIG. 14 is a circuit diagram of a first predrive circuit in the PWM inverter output circuit shown in FIG. 12.

FIG. 14 shows the circuit diagram of the first predrive circuit 17a. The first predrive circuit 17a comprises, as shown in FIG. 14, a state detection circuit 34a, filter circuits FL4 and FL5, latch circuit RS4, driver control circuit 36a, and output driver circuit 37a.

The state detection circuit 34a comprises NAND gates NA33 and NA34, and inverters IV34 and IV35.

The filter circuits FL4 and FL5 comprise a resistance, a diode, a capacitor, and an inverter. The latch circuit RS4 is an RS flip-flop with contacts for set input /S, reset inputs /R1 and /R2, and output Q. The order of precedence in latch circuit RS4 is /R1>/S>/R2. Note, further, that the driver control circuit 36a comprises NAND gate NA35, and inverters IV40 and IV41.

The output driver circuit 37a comprises serially connected switching elements Q61 and Q62. Switching element Q61 is a p-channel MOSFET, and switching element Q62 is an n-channel MOSFET. A common node between switching element Q61 and Q62 is the output terminal of this output driver, and is connected to a node between the first and second power elements P11 and P12 of the power circuit 11a. The high voltage side of the switching element Q61 is connected through resistor R21 to the gate of first power element P11.

Note that the first predrive circuit 17a of the present embodiment also comprises a bypass circuit 41 and bypass control circuit 42a as provided in the predrive circuit 17 of the first embodiment.

The gate-source potential of the first power element P11, and the on/off state of the first power element P11, are controlled by controlling the on/off states of the switching elements Q61 and Q62 in the output driver circuit 37a of this first predrive circuit 17a. Then, the supply voltage for driving the power element P11 is drawn from the energy stored to the power supply capacitor C1.

Figure 15:
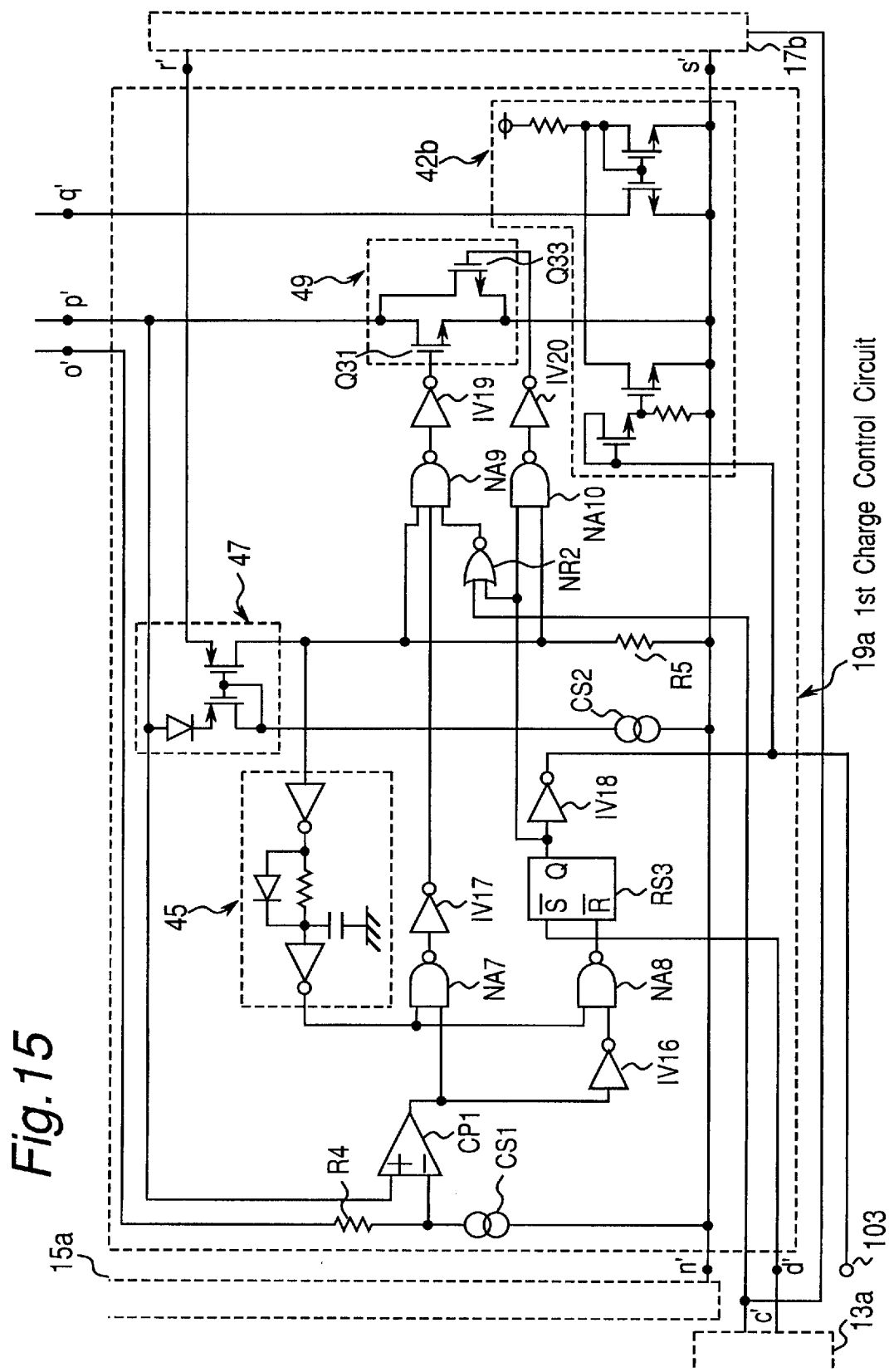
FIG. 15 is a circuit diagram of a first charge control circuit in the PWM inverter output circuit shown in FIG. 12.

The first charge control circuit 19a is described next with reference to FIG. 15.

The first charge control circuit 19a controls charging the power supply capacitor C1. The configuration and operation of the first charge control circuit 19a are the same as those of the charge control circuit 19 in the first embodiment described above, and further description thereof is omitted below.

Figure 16:
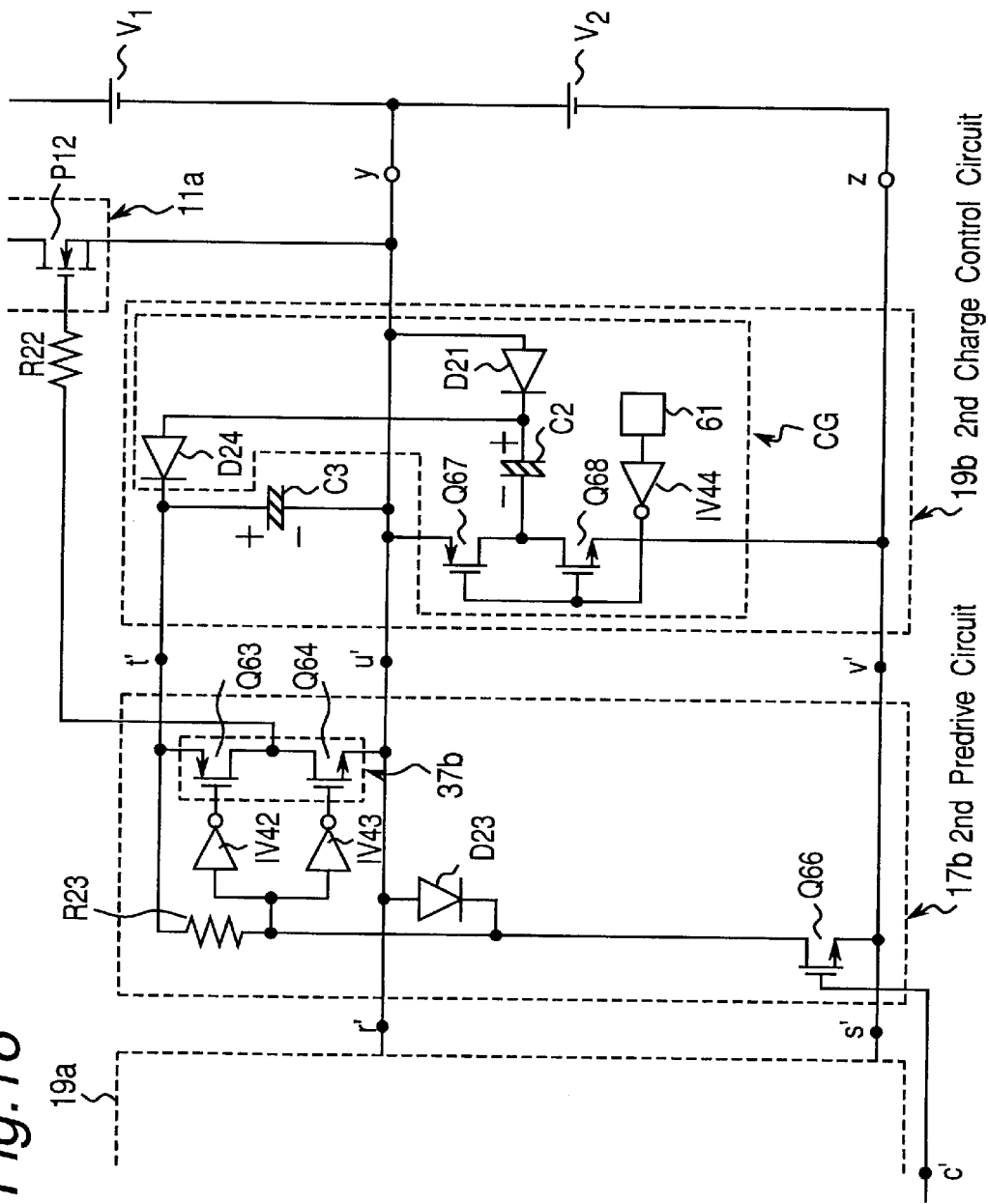
FIG. 16 is a circuit diagram of a second predrive circuit and second charge control circuit in the PWM inverter output circuit shown in FIG. 12.

The second predrive circuit 17b and second charge control circuit 19b are shown in FIG. 16. The second predrive circuit 17b comprises an n-channel MOSFET Q66, resistor R23, diode D23, inverter IV42 and IV43, and output driver circuit 37b.

The output driver circuit 37b comprises a p-channel MOSFET switching element Q63, and an n-channel MOSFET switching element Q64. A common node between switching element Q63 and Q64 is an output terminal of this output driver. The output terminal is connected through resistor R22 to the gate of the second power element P12.

The gate-source potential of the second power element P12 is controlled and the second power element P12 is thus driven by mutually switching the switching elements Q63 and Q64 on and off in this second predrive circuit 17b. Note that a power supply capacitor C3 in the second charge control circuit 19b is used as the drive power source for the second power element P12.

The second charge control circuit 19b comprises a power supply capacitor C3 and charge pump CG. The charge pump CG comprises an oscillator 61, inverter IV44, p-channel MOSFET Q67, n-channel MOSFET Q68, capacitor C2, and diodes D21 and D24. The charge pump CG charges the power supply capacitor C3 from the control power source V2. The charge pump CG is known from the literature, however, and further description thereof is thus omitted below.

B. Operation

The operation of a PWM inverter output circuit thus comprised is described next below. The operation of this PWM inverter output circuit is basically the same as the operation of the PWM inverter output circuit according to the first embodiment, and is therefore briefly described below.

The present embodiment is described herein as setting the power circuit 11a to a free-run state when the motor free signal goes low, and to normal operation when the motor free signal is high. When the switching command signal is high, the first power element P11 is on; when low, the second power element P12 is on.

During normal operation when the first power element P11 is on (both the motor free signal and switching command signal are high), outputs X and Y of the logic circuit 31a in the input signal processor 13a are high and low, respectively. The signal lines 25a and 27a in the level shift circuit 15a are controlled low and high, respectively. The NAND gate NA33 of the state detection circuit 34a in the first predrive circuit 17a detects the control state, and the latch circuit RS4 is set.

Based on the output from the latch circuit RS4, the driver control circuit 36a switches the switching element Q61 off and switching element Q62 on. Then, the first power element P11 switches on using the power supply capacitor C1 as a power source.

As in the first embodiment, when the reference potential of the first predrive circuit 17a rises, the signal lines 25a and 27a go momentarily low as a result of the floating capacitance on the signal lines. The state detection circuit 34a, however, does not recognize the state in which each of the signal lines 25a and 27a is low, and misoperation as a result of this floating capacitance is prevented.

As also described in the first embodiment, output X of the logic circuit 31a goes from high to low after a predetermined period of time, thereby cutting off current flow to the signal lines 25a and 27a.

The output of NAND gate NA2 in the input signal processor 13a goes high at this time and a high is applied to the gate of MOSFET Q66 in the second predrive circuit 17b. MOSFET Q66 therefore switches on, a high is applied to the gate of switching element Q63 and switching element Q64, and switching element Q64 switches on. Therefore, the second power element P12 switches off.

The case in which the second power element P12 is turned on (the motor free signal is high and the switching command signal is low) during normal operation is considered next.

A low is applied to the MOSFET Q66 of second predrive circuit 17b at this time, and MOSFET Q66 switches off. A low is applied to switching elements Q63 and Q64, and switching element Q63 switches on. The second power element P12 thus turns on using the power supply capacitor C3 as a power source.

Input A of logic circuit 31a in the input signal processor 13a goes low at this time, and outputs X and Y go low and high. The signal lines 25a and 27a of the level shift circuit 15a are thus controlled high and low.

The control states of the signal lines 25a and 27a are detected by the NAND gate NA34 of the state detection circuit 34a in the first predrive circuit 17a, and the latch circuit RS4 is reset. Based on the output from the latch circuit RS4, the driver control circuit 36a turns switching element Q61 on, and switching element Q62 off. The first power element P11 thus switches off.

As in the first embodiment, when the reference potential of the first predrive circuit 17a drops, the signal lines 25a and 27a go momentarily high as a result of the floating capacitance on the signal lines. The state detection circuit 34a, however, does not recognize the state in which each of the signal lines 25a and 27a is high, and misoperation as a result of this floating capacitance is prevented.

As also described in the first embodiment, output Y of the logic circuit 31a goes from high to low after a predetermined period of time, thereby cutting off current flow to the signal lines 25a and 27a. At this time, output Y can also remain high after a predetermined period of time.

Operation when the power circuit 1a is controlled to a free-run state is described next.

When the power circuit 11a is controlled to a free-run state, the motor free signal is low, and a low is applied to input A of the logic circuit 31a. This is the same as the above-described operation whereby the second power element P12 is switched on; the first power element P11 is turned off by a similar procedure. The output of NAND gate NA2 at this time is high, which is again the same as turning the first power element P11 on above and the second power element P12 off. The power circuit 11a can thus be controlled to a free-run state. Note that when controlled to the free-run state, operation is not affected by the floating capacitance present on the signal lines 25a and 27a for the same reasons described in the first embodiment.

The operation of the first charge control circuit 19a is identical to that of the charge control circuit 19 in the first embodiment, and further description thereof is thus omitted below.

As will be known from the above description, the predrive circuits and charge control circuits of a PWM inverter output circuit according to the present embodiment can achieve the same benefits as described in the first embodiment above when applied to a power circuit comprising a pair of n-channel MOSFETs each controlled by a different control signal.

(Embodiment 3)

A different version of a PWM inverter output circuit for a power circuit configured identically to that of the second embodiment is described next as a third embodiment of the present invention with reference to FIG. 18.

A. Circuit Configuration

Figure 18:
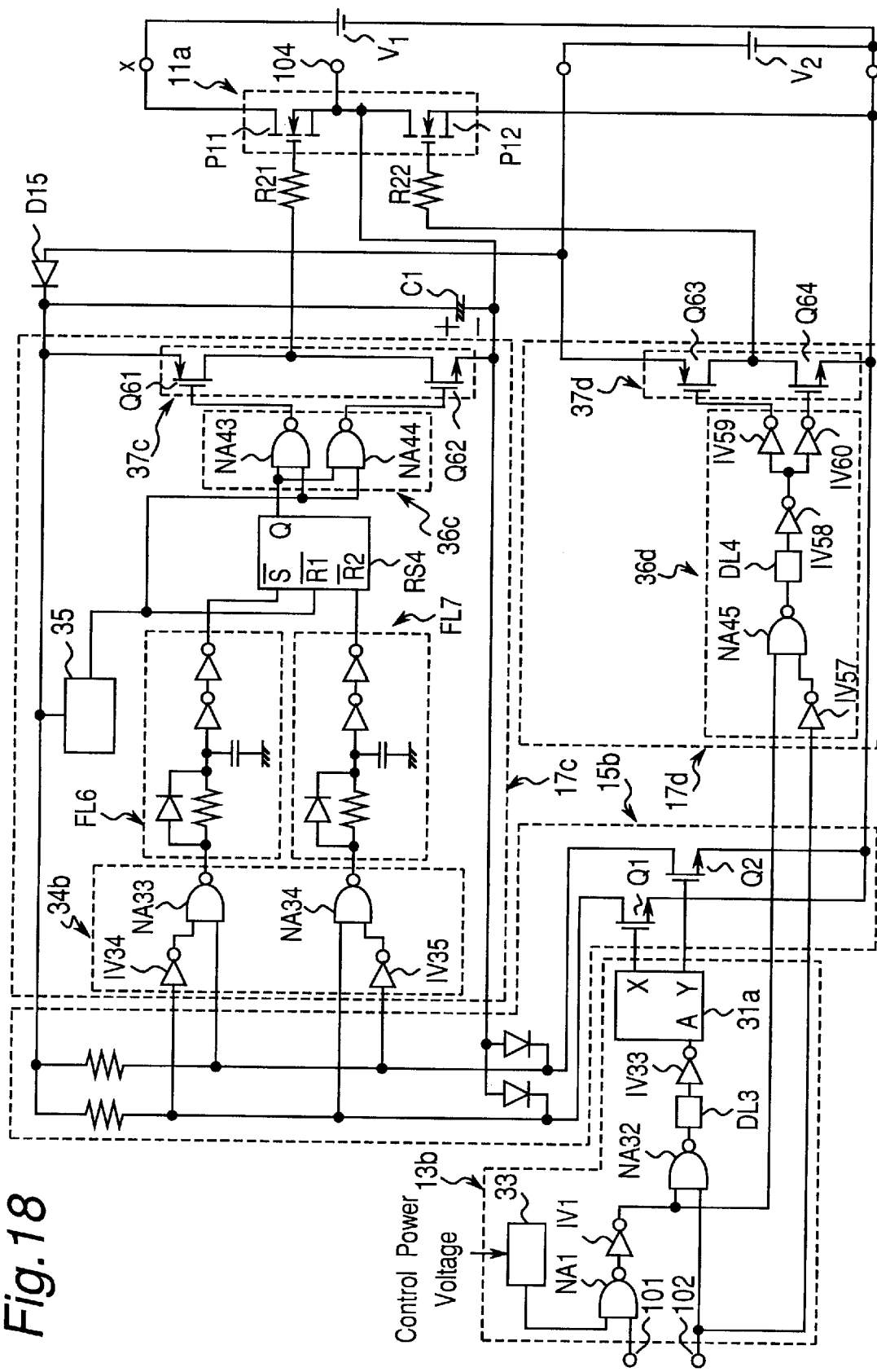
FIG. 18 is a block diagram of a PWM inverter output circuit according to a third embodiment of the present invention.

As shown in FIG. 18, the PWM inverter output circuit according to the present embodiment comprises a power circuit 11a having first and second power elements P11 and P12 for outputting a drive voltage to a motor; an input signal processor 13b to which control information for controlling the power circuit 11a is input; a level shift circuit 15b for setting a signal line carrying the control information to a predetermined control state based on the supplied control information; a first predrive circuit 17c for controlling driving the first power element P11 of the power circuit 11a based on a predetermined control state; a second predrive circuit 17d for controlling driving the second power element P12 of the power circuit 11a based on a predetermined control state; a power supply capacitor C1 used as the power source for driving first power element P11; a main dc power source V1 for supplying an output voltage; and a control power source V2 for supplying power for driving the overall circuitry of the PWM inverter output circuit.

These elements of the PWM inverter output circuit are described in further detail below.

The configuration of the power circuit 11a and level shift circuit 15b in this embodiment are the same as those of the second embodiment above, and further description is thus omitted below.

The input signal processor 13b comprises NAND gates NA1, NA2, and NA32, inverters IV1 and IV33, logic circuit 31a, delay circuit DL3, control power monitor 33.

The delay circuit DL3 delays signal transmission to generate dead time. The control power monitor 33 and logic circuit 31a are identical to those of the second embodiment.

The input signal processor has input terminals 101 and 102. Control information for the power circuit 11a is supplied through the input terminals 101 and 102. A motor free signal is applied to input terminal 101, and the switching command signal is applied to input terminal 102.

The first predrive circuit 17c comprises, as shown in FIG. 18, a state detection circuit 34b, filter circuits FL6 and FL7, a latch circuit RS4, a driver control circuit 36c, an output driver circuit 37c, and an insufficient voltage detector 35.

The state detection circuit 34b, filter circuits FL6 and FL7, a latch circuit RS4, and an output driver circuit 37c are identical to those of the second embodiment.

The driver control circuit 36c comprises NAND gates NA43 and NA44, to each of which are applied signals from the insufficient voltage detector 35 and latch circuit RS4. More specifically, the output of NAND gate NA43 is applied to the gate of switching element Q61, and the output of NAND gate NA44 is applied to the gate of switching element Q62. The output terminal of the output driver circuit 37c (that is, a node between switching elements Q61 and Q62) is connected through a resistor R21 to the gate of the first power element P11. The source of the switching element Q62 is connected to the source of the first power element P11 in the output driver circuit 37c. A power supply capacitor C1 is connected parallel to the output driver circuit 37c. A diode D15 is connected between the high voltage side of the power supply capacitor C1 and the positive side of the control power source V2 with the cathode thereof toward the power supply capacitor C1 and the anode toward the control power source V2.

The second predrive circuit 17d comprises a driver control circuit 36d and an output driver circuit 37d. The driver control circuit 36d comprises NAND gate NA45, a delay circuit DL4, and inverters IV57 to IV60. The output driver circuit 37d is identical to the output driver circuit 37 of the first embodiment. In the output driver circuit 37d, the source of switching element Q63 is connected to the positive side of the control power source V2, and the source of the switching element Q64 is connected to the negative side of the control power source V2. A node between switching elements Q63 and Q64 is the output terminal of the output driver circuit 37d, and is connected through a resistor R22 to the gate of the second power element P12.

B. Operation

The operation of a PWM inverter output circuit thus comprised is basically the same as the operation of the PWM inverter output circuit according to the first embodiment. That is, the power elements P11 and P12 of the power circuit 11a can be controlled based on the motor free signal and switching command signal.

More specifically, both the motor free signal and switching command signal must be high to turn the first power element P11 on. The signal lines 25a and 27a go low and high, respectively, and the latch circuit RS4 is set based on the control state detected by the state detection circuit 34b.

Based on the output from the latch circuit RS4, the driver control circuit 36c switches the switching element Q61 on. As a result, the first power element P11 switches on. A low is applied via inverter IV57 to the NAND gate NA45 at the same time, resulting in a high at the output. The switching element Q64 thus switches on, and the second power element P12 switches off.

The power supply capacitor C1, which is used as the power source for driving the first power element P11, is charged while the second power element P12 is on. The charging path at this time is from the positive side of the control power source V2 to diode D15, the power supply capacitor C1, the second power element P12, and then to the negative side of the control power source V2.

To turn the second power element P12 on, the motor free signal goes high and the switching command signal goes low. Operation at this time is the reverse logic of operation when the first power element P1 is on, that is, the first power element P11 switches off and the second power element P12 switches on. The second power element P12 is thus driven by the voltage from the control power source V2 applied by way of the switching element Q63 in the second predrive circuit 17d.

The power circuit 11a can be controlled to a free-run state by driving the motor free signal low.

As will be known from the above description, the predrive circuits and charge control circuits of a PWM inverter output circuit according to the present embodiment can achieve the same benefits as described in the second embodiment above when applied to a power circuit comprising only n-channel MOSFETs.

(Embodiment 4)

Figure 19:
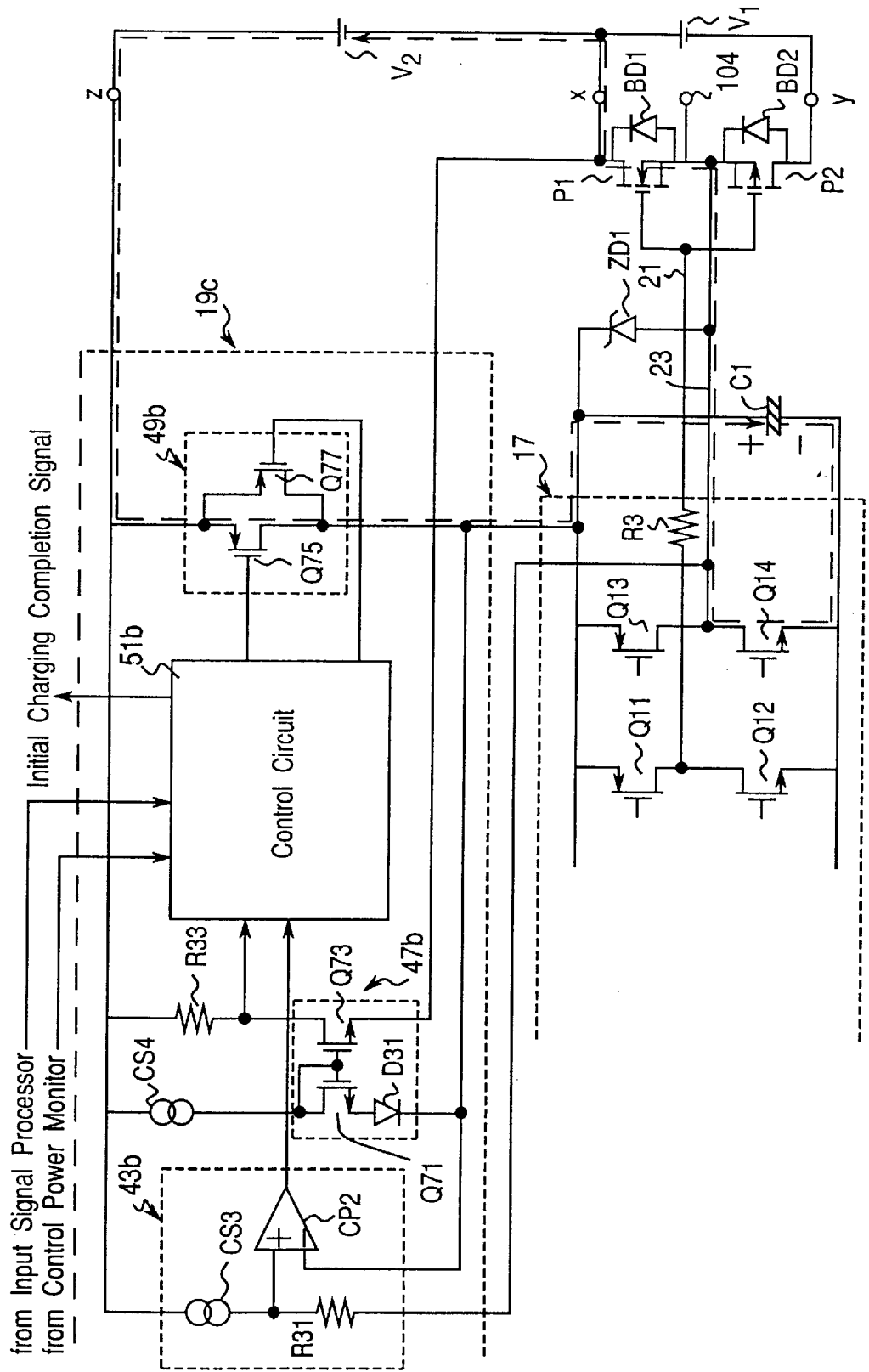
FIG. 19 is a block diagram of a PWM inverter output circuit according to a third embodiment of the present invention in which the charge control circuit and control power source are connected on the high voltage side of the main dc power source.
Figure 20:
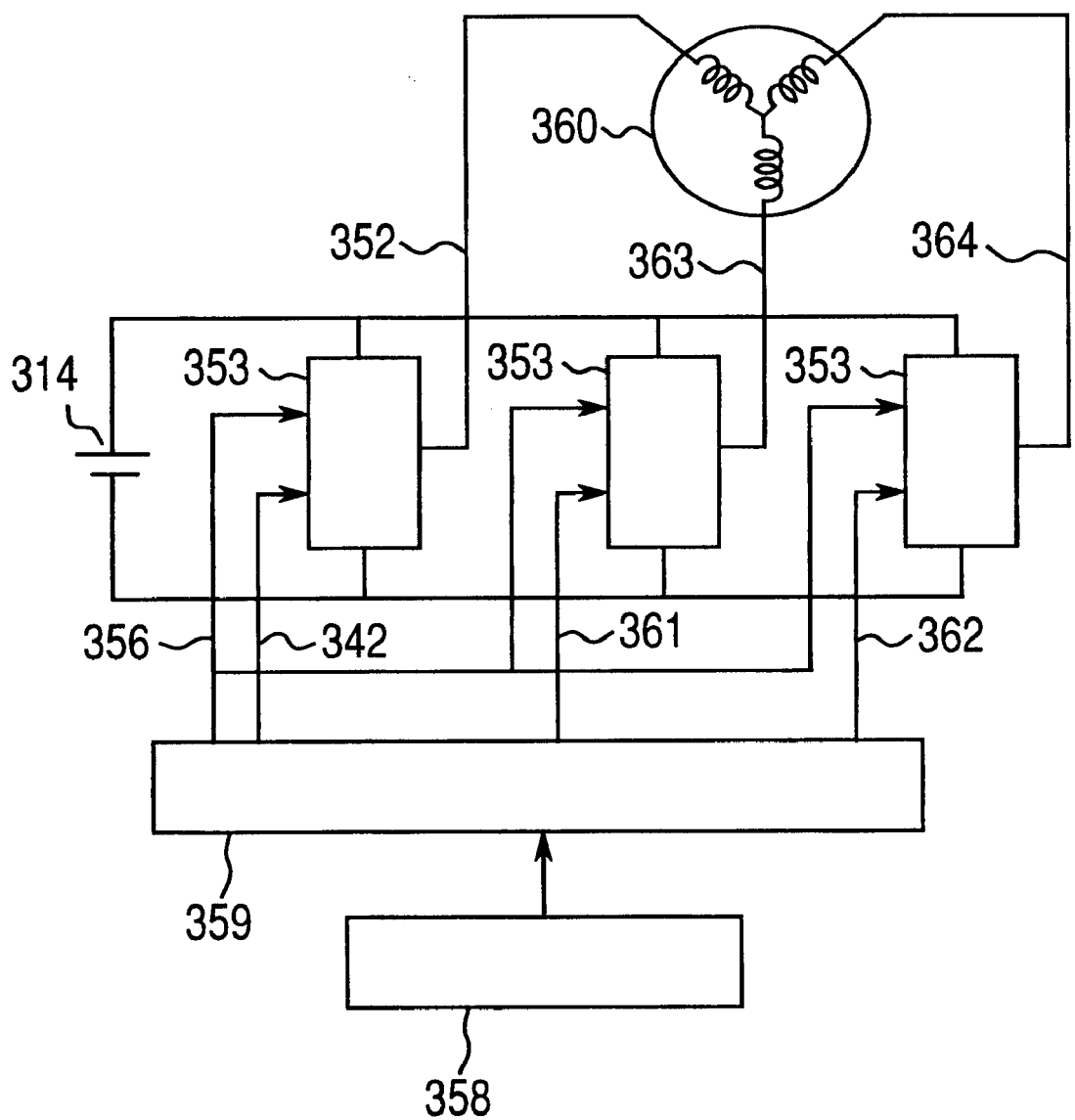
FIG. 20 is a block diagram of a typical conventional PWM inverter.
Figure 21:
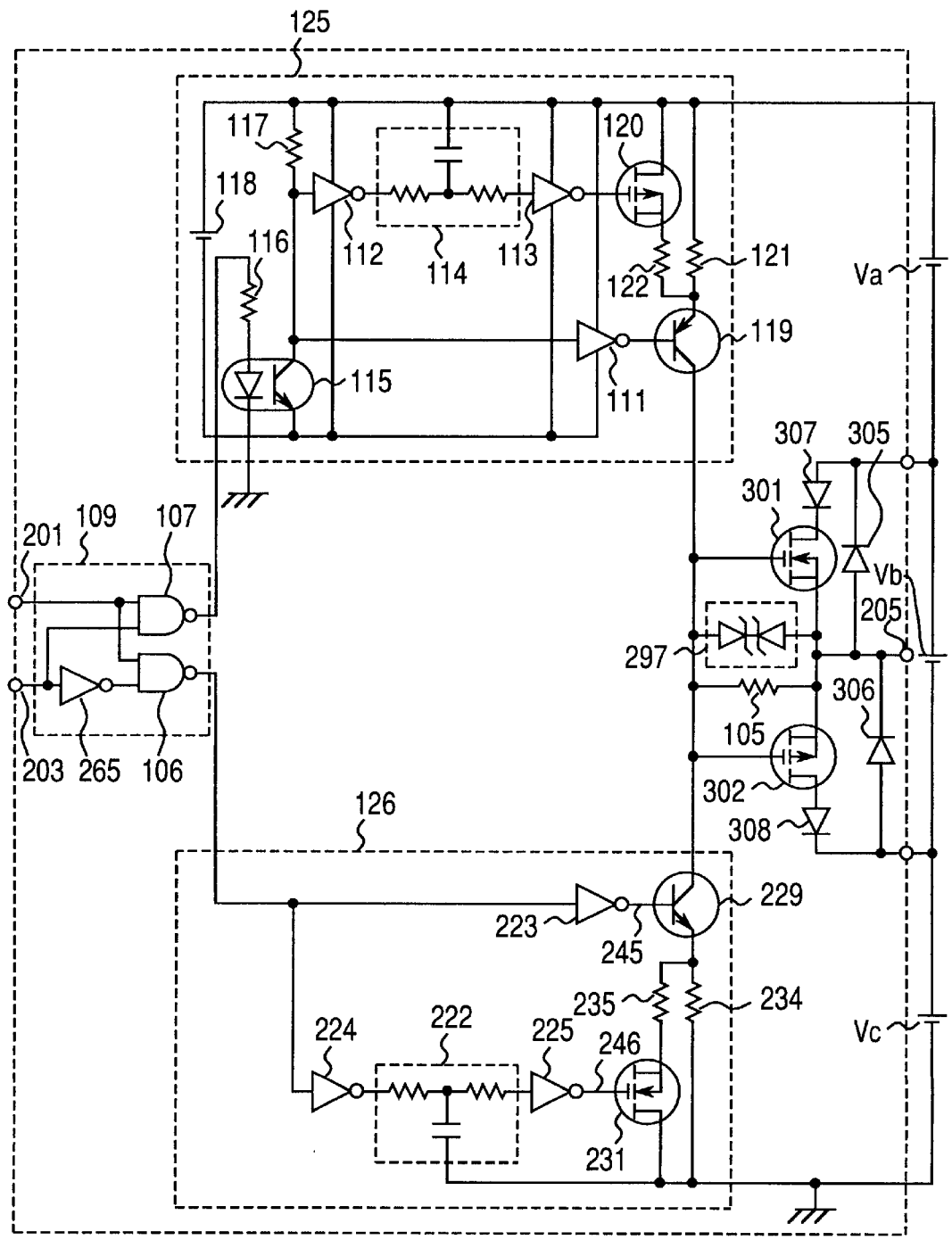
FIG. 21 is a circuit diagram of a conventional PWM inverter output circuit.

The control power source V2 and circuit parts operated by the control power source V2 can be provided on the high voltage side of the main dc power source V1 in a PWM inverter output circuit according to the first embodiment described above. A circuit diagram for a charge control circuit used in this case is shown in FIG. 19.

As will be known from the figure, the charge control circuit 19c comprises a capacitor voltage monitor 43b, a predrive reference potential monitor 47b, a control circuit 51b and a charging current circuit 49b.

The capacitor voltage monitor 43b comprises a constant current source CS3, a resistor R31, and a comparator CP2. The capacitor voltage monitor 43b monitors both end voltages of the power supply capacitor C1 similarly to the capacitor voltage monitor 43 of the first embodiment, and outputs high when the detected voltage drops to or below a predetermined value.

The predrive reference potential monitor 47b comprises a constant current source CS4, n-channel MOSFETs Q71 and Q73, and a diode D31. When the reference potential of the predrive circuit 17 rises higher than a predetermined value, MOSFET Q73 switches on and the predrive reference potential monitor 47b output goes low.

The charging current circuit 49b comprises a p-channel MOSFET Q75 and a p-channel MOSFET Q77 in a parallel circuit arrangement.

The control circuit 51b controls the on/off states of MOSFETs Q75 and Q77 in the charging current circuit 49b by means of logic gates, for example, based on the outputs from the capacitor voltage monitor 43b, the predrive reference potential monitor 47b, the input signal processor 13, and the control power monitor 33. The signal output from the input signal processor 13 is based on the motor free signal and switching command signal.

The charge control circuit 19c thus comprised operates the same as that of the first embodiment. Note that the low voltage side of the switching element Q14 in the second output driver is included in the charging path of the power supply capacitor C1 in this case. More specifically, the charging path is formed when a connection between the low voltage side of the power supply capacitor C1 and the output terminal of the power circuit is completed. The charging path in this case is, as shown in FIG. 19, from the positive side of the control power source V2 to the charging current circuit 49b, power supply capacitor C1, switching element Q14, the parasitic diode BD1 of first power element P1, and then to the negative side of the control power source V2.

Benefits of the Invention

In a PWM inverter output circuit according to one preferred embodiment of the present invention, the predrive circuit comprises a state detection circuit for detecting a control state from a combination of logic signals converted from the input signals applied thereto, and a latch circuit for holding a detected control state. A power circuit is controlled based on the control state stored by the latch, and the state detection circuit detects as valid control states only those control states in which all logic signals are not the same state.

Spurious effects resulting from the floating capacitance of the signal lines used for transferring the logic signals can thereby be eliminated, and the power circuit can prevent the effects of dv/dt transient signals during PWM control.

As a result, the circuit can be achieved without using a pulse filter to remove transient signals, and the problems of degraded response and dv/dt transient signals arising from a pulse filter can be resolved.

The input signal processor and predrive circuit are also cut off after the control state corresponding to the input signal is stored by the input signal processor. Power consumption by the circuits and power supply capacitor is thus reduced. This is particularly effective during two-phase PWM control.

The output voltage of the control power source is also monitored in a PWM inverter output circuit, enabling both power elements of the power circuit to be switched off to a free-run state when a problem is detected in the control power source. Damage to the PWM inverter output circuit can thus be prevented, and safe operation made possible.

A PWM inverter output circuit according to another embodiment of the present invention further comprises a charging control circuit for controlling charging the power supply capacitor, and charges the power supply capacitor using as the charging path a path through a switching element of the output driver and the output terminal of the power circuit. Charging during the free-run state is thus made possible, and a driven motor can be safely started when, for example, the motor shaft is turning due to some external factor.

The reference potential of the predrive circuit is also monitored to start charging when this reference potential drops a sufficient amount. Low loss charging is thus possible. The voltage at both ends of the capacitor is also monitored, and the capacitor is only charged when said voltages drop to a predetermined level. Overcharging the power supply capacitor can thus be prevented, charging loss can be reduced, and the voltage between the power supply capacitor terminals can be stabilized.

Overcharging can also be prevented without the charge stored to the power supply capacitor leaking by providing a voltage clamping means at each end of the power supply capacitor downstream of the output driver switching elements.

The spurious effects introduced by a parasitic diode in the switching elements can also be avoided by using a bypass circuit to form an alternative current path during charging. Alternatively, a charging bypass circuit can be provided to prevent the flow of charging current to the switching elements during charging, thereby again avoiding any spurious effects introduced by such parasitic diodes.

A PWM inverter output circuit according to a further embodiment of the invention appropriately switches the charging modes used for charging the power supply capacitor. More specifically, the current used for a refresh charging mode used to refresh the capacitor charge during normal operation is greater than the current used in an initial charging mode whereby the capacitor is initially charged at the start of operation. As a result, the capacitor charge can be rapidly refreshed during operation without increasing the output capacity of the control power source.

The optimal charging mode can thus be selected according to the current charge state.

A charging completion signal is also output when initial charging is completed. This signal can thus be referenced to enable safe, rapid starting of the motor without damage to the system overall or the motor.

In a PWM inverter output circuit according to a further embodiment of the invention, an alternative current path is formed by a bypass circuit parallel to the switching element when charging the power supply capacitor. The charging current can thus be prevented from flowing to the switching elements, and the spurious effects of a parasitic diode at the switching element can be avoided.

A PWM inverter output circuit according to a further embodiment of the invention substitutes for the power circuit of the above-described embodiments a power circuit having a first power element and a second power element. The first power element comprises a control electrode and a reference electrode, and is conductive to the reference electrode when a positive voltage is applied to the control electrode. The second power element likewise comprises a control electrode and a reference electrode, and is conductive to the reference electrode when a negative voltage is applied to the control electrode. This PWM inverter output circuit also attains the above-described benefits.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A PWM inverter output circuit comprising:
   a main dc power source;
   a power circuit having
      a first power element comprising a first control electrode and a first reference electrode, said first power element being conductive when a positive voltage with respect to the first reference electrode is applied to the first control electrode, and
      a second power element comprising a second control electrode and a second reference electrode, said second power element being conductive when a negative voltage with respect to the second reference electrode is applied to the second control electrode, said first and second reference electrodes being connected together, and said first and second control electrodes being connected together;
   a control power source;
   a power supply capacitor being charged by an output voltage of the control power source;
   an input signal processor for receiving a command signal which controls turning on and off said power elements and for producing a predetermined plurality of logic signals; and
   a predrive circuit having:
      a state detection circuit for detecting a requested control state from a combination of said plurality of logic signals outputted from the input signal processor,
      a latch circuit for holding said requested control state detected by the state detection circuit,
      a first output driver comprising a pair of switching elements serially connected between terminals of the power supply capacitor for controlling a voltage applied to said first and second control electrodes, and
      a second output driver comprising a pair of switching elements serially connected between terminals of the power supply capacitor for controlling a voltage applied to said first and second reference electrodes, said first and second output drivers driving said power circuit using the power supply capacitor as a power source by controlling turning on and off said switching elements based on said requested control state held by the latch circuit to control a voltage between said first control electrode and said first reference electrode and a voltage between said second control electrode and said second reference electrode.

2. The PWM inverter output circuit according to claim 1, wherein the state detection circuit detects a state excluding a state in which all of the plurality of logic signals output from the input signal processor are the same state.

3. The PWM inverter output circuit according to claim 1, wherein the input signal processor electrically isolates the input signal processor from the state detection circuit after a control state corresponding to outputted logic signals is latched by the latch circuit when the power supply capacitor is not charged.

4. The PWM inverter output circuit according to claim 1, further comprising a power source monitor circuit for monitoring an output voltage of the control power source,
   said input signal processor generating a logic signal resulting in both power elements of the power circuit switching to an off state, and electrically isolating said input signal processor from the state detection circuit after said control state corresponding to outputted logic signals is latched by the latch circuit, when the output voltage of the control power source is not normally based on an output of said power source monitor circuit.

5. The PWM inverter output circuit according to claim 1, wherein one power element is a power MOSFET.

6. The PWM inverter output circuit according to claim 1, wherein one power element comprises:
   a power MOSFET;
   a first diode series connected to said power MOSFET in the conduction direction of said power MOSFET for preventing reverse current conduction in said power MOSFET; and
   a second diode parallel connected to a series circuit comprising said power MOSFET and said first diode, the conduction direction of said second diode being opposite that of said series circuit.

7. The PWM inverter output circuit according to claim 1, wherein one power element comprises an insulated gate bipolar transistor (IGBT), and a diode connected parallel to and opposite the conduction direction of the IGBT.

8. A PWM inverter output circuit comprising:
   a main dc power source;
   a power circuit having:
      a first power element comprising a first control electrode and a first reference electrode, and being conductive when a positive voltage with respect to the first reference electrode is applied to the first control electrode, and
      a second power element comprising a second control electrode and a second reference electrode, and being conductive when a negative voltage with respect to the second reference electrode is applied to the second control electrode,
      said first and second reference electrodes being connected together, and said first and second control electrodes being connected together;
   a control power source;
   a power supply capacitor being charged by an output voltage of the control power source;
   an input signal processor for receiving an command signal which controls turning on and off said power elements and for producing predetermined logic signals;

a predrive circuit having:
- a first output driver comprising a pair of switching elements serially connected between terminals of the power supply capacitor for controlling said first and second control electrodes, and
- a second output driver comprising a pair of switching elements serially connected between terminals of the power supply capacitor for controlling said first and second reference electrodes,
- said predrive circuit driving the power circuit by controlling turning on and off the switching elements in said first and second output drivers based on said logic signals from the input signal processor to control respectively a voltage between said first control electrode and said first reference electrode and a voltage between said second control electrode and said second reference electrode to predetermined values;

a bypass circuit for forming an alternative path through which current flowing to a switching element is rerouted when said bypass circuit is on,
- said switching element being part of a charging path used for power supply capacitor charging, and
- the bypass circuit being parallel connected to the switching element in the direction of current flow through the switching element; and a bypass control circuit for turning the bypass circuit on when the switching element cannot form a charging path because of the low voltage between terminals of the power supply capacitor.

9. A PWM inverter output circuit comprising:

a main dc power source;

a power circuit having:
- a first power element comprising a first control electrode and a first reference electrode, said first power element being conductive when a positive voltage with respect to the first reference electrode is applied to the first control electrode, and
- a second power element comprising a second control electrode and a second reference electrode, said second power element being conductive when a negative voltage with respect to the second reference electrode is applied to the second control electrode,
- said first and second reference electrodes being connected together, and said first and second control electrodes being connected together;

a control power source;

a power supply capacitor being charged by an output voltage of the control power source;

an input signal processor for receiving a command signal which controls turning on and off said power elements and for producing predetermined logic signals;

a predrive circuit having:
- a first output driver comprising a pair of switching elements serially connected between terminals of the power supply capacitor for controlling a voltage applied to said first and second control electrodes, and
- a second output driver comprising a pair of switching elements serially connected between terminals of the power supply capacitor for controlling a voltage applied to said first and second reference electrodes,
- said predrive circuit driving the power circuit by controlling turning on and off the switching elements in said first and second output drivers based on said logic signals from the input signal processor to control a voltage between the first reference electrode and the first control electrode and a voltage between the second reference electrode and the second control electrode to predetermined values respectively;

a charging means for sweeping current for charging the power supply capacitor; and a charging path comprising a first path connecting one end of the control power source and one end of the power supply capacitor through an output terminal of the power circuit, and a second path connecting the other end of the power supply capacitor and the other end of the control power source through said charging means;
said power supply capacitor being charged by an output voltage from the control power source passed via said charging path.

10. The PWM inverter output circuit according to claim 9, further comprising:
- a capacitor voltage monitoring means for monitoring both end voltages of the power supply capacitor; and
- a charge control circuit for charging the power supply capacitor when both end voltages of the power supply capacitor are less than or equal to a predetermined value, and for ending charging the power supply capacitor when both end voltages of the power supply capacitor are greater than or equal to a predetermined value.

11. The PWM inverter output circuit according to claim 10, wherein the charge control circuit outputs a charging completion signal indicative of charging being completed when a monitored voltage of the power supply capacitor is greater than or equal to a predetermined value based on output from the capacitor voltage monitoring means.

12. The PWM inverter output circuit according to any of claims 9, wherein said first path passes a switching element of the output driver where said switching element is connected to said one end of the power supply capacitor.

13. The PWM inverter output circuit according to claim 12, wherein the charge control circuit makes the switching element contained in said first path conductive when charging the power supply capacitor.

14. The PWM inverter output circuit according to claims 9, further comprising a parasitic prevention circuit for connecting an output terminal of the power circuit and said one end of the power supply capacitor, whereby said first path passes said parasitic prevention circuit.

15. The PWM inverter output circuit according to claim 14, wherein the parasitic prevention circuit is a series circuit comprising a resistor and a diode, said parasitic prevention circuit being parallel connected to one of the switching elements of the second output driver and having a node between the resistor and diode connected to an output terminal of the power circuit.

16. The PWM inverter output circuit according to claim 14, wherein the parasitic prevention circuit comprises a diode circuit having a pair of diodes parallel connected in opposite directions, and a diode serially connected to said diode circuit, said parasitic prevention circuit being parallel connected to one of the switching elements of the second output driver and having a node between the diode circuit and the diode connected to an output terminal of the power circuit.

17. The PWM inverter output circuit according to claim 9, further comprising:
- a reference potential monitoring means for monitoring a reference potential of the predrive circuit; and a charge control circuit for controlling a charging current based on an output from the reference potential monitoring means such that the power supply capacitor is charged using only a first charging current when the reference potential of the predrive circuit is not within a predetermined range, and is charged using at least a second charging current when said reference potential is within a predetermined range; and, wherein said charging means comprises a first charging current device for sweeping the first charging current, which is a minute current, and a second charging current device for sweeping a second charging current that is greater than the first charging current.

18. The PWM inverter output circuit according to claim 17, wherein the charge control circuit further comprises a capacitor voltage monitoring means for monitoring a voltage at each end of the power supply capacitor, said charge control circuit charging the power supply capacitor when said monitored voltage is less than or equal to a predetermined value based on an output from the capacitor voltage monitoring means, and ending power supply capacitor charging when said monitored voltage is greater than or equal to a predetermined value.

19. The PWM inverter output circuit according to claim 9, further comprising a voltage clamping means for voltage limiting, said voltage clamping means being disposed between an output terminal of the second output driver and said other end of the power supply capacitor.

20. The PWM inverter output circuit according to claim 19, wherein said voltage clamping means is a Zener diode.

21. A PWM inverter output circuit comprising:

a main dc power source;

a power circuit having:
  a first power element comprising a first control electrode and a first reference electrode, said first power element being conductive when a positive voltage with respect to the first reference electrode is applied to the first control electrode, and
  a second power element comprising a second control electrode and a second reference electrode, said second power element being conductive when a negative voltage with respect to the second reference electrode is applied to the second control electrode,
  said first reference electrode and said second reference electrode being connected together, and said first control electrode and said second control electrode being connected together;

a control power source;

a power supply capacitor being charged by an output voltage of said control power source;

an input signal processor for receiving a command signal which controls turning on and off said power elements and for producing predetermined logic signals;

a predrive circuit having:
  a first output driver comprising a pair of switching elements serially connected between terminals of the power supply capacitor for controlling a voltage applied to said first and second control electrodes, and
  a second output driver comprising a pair of switching elements serially connected between terminals of the power supply capacitor for controlling a voltage applied to said first and second reference electrodes,
  said predrive circuit driving the power circuit by controlling turning on and off the switching elements in said first and second output drivers based on said logic signals from said input signal processor to control respectively a voltage between said first control electrode and said first reference electrode and a voltage between said second control electrode and said second reference electrode to predetermined values;

a charging means comprising:
  an initial charging means for sweeping current for charging the power supply capacitor before a start of operation, and
  a refresh charging means for sweeping current for charging the power supply capacitor after operation starts; and a charging path comprising a first path connecting one end of the control power source and one end of the power supply capacitor through an output terminal of a power circuit, and a second path connecting the other end of the power supply capacitor and the other end of the control power source through said initial charging means or refresh charging means;

said power supply capacitor being charged by an output voltage from the control power source passed via said charging path.

22. The PWM inverter output circuit according to claim 21, further comprising a capacitor voltage monitoring means for monitoring both end voltages of the power supply capacitor; and wherein at least one of the initial charging means and refresh charging means, during their respective charging operations, charges the power supply capacitor when both end voltages of the power supply capacitor are less than or equal to a predetermined value, and ends charging the power supply capacitor when both end voltages of the power supply capacitor are greater than or equal to a predetermined value, based on an output of the capacitor voltage monitoring means.

23. The PWM inverter output circuit according to claim 22, wherein the charge control circuit during initial charging outputs a charging completion signal indicative of charging being completed when both end voltages of the power supply capacitor are greater than or equal to a predetermined value, based on an output of the capacitor voltage monitoring means.

24. The PWM inverter output circuit according to claim 21, further comprising a voltage clamping means for voltage limiting, said voltage clamping means being disposed between an output terminal of the second output driver and said other end of the power supply capacitor.

25. The PWM inverter output circuit according to claim 24, wherein the voltage clamping means is a Zener diode.

26. The PWM inverter output circuit according to claim 21, wherein the refresh charging means comprises
  a reference potential monitoring means for monitoring a reference potential of the predrive circuit, and
  a main charging current means for emitting a refresh charging current greater than a charging current of the initial charging means;
  whereby the power supply capacitor is charged using at least the refresh charging current when the reference potential of the predrive circuit is within a predetermined range based on output from the reference potential monitoring means.

27. The PWM inverter output circuit according to claim 21, wherein the initial charging means comprises
  a reference potential monitoring means for monitoring a reference potential of the predrive circuit, an auxiliary charging current means for emitting a small current, and an initial charging current means for emitting an initial charging current greater than said small current;

whereby the power supply capacitor is charged using only the small current from the auxiliary charging current means when the reference potential of the predrive circuit is not within a predetermined range based on output from the reference potential monitoring means, and the power supply capacitor is charged using at least the initial charging current when the reference potential of the predrive circuit is within a predetermined range.

28. A PWM inverter output circuit comprising:

a main dc power source;

a power circuit having a first power element comprising a first control electrode and a first reference electrode, and being conductive when a predetermined voltage with respect to the first reference electrode is applied to the first control electrode, and a second power element comprising a second control electrode and a second reference electrode, and being conductive when a predetermined voltage with respect to the second reference electrode is applied to the second control electrode;

a control power source;

a power supply capacitor being charged by an output voltage of the control power source;

an input signal processor for receiving a command signal which controls turning on and off said power elements and for producing predetermined logic signals;

a first predrive circuit comprising a first output driver having a pair of switching elements serially connected between terminals of the power supply capacitor, and driving said first power element by controlling turning on and off the switching elements based on said logic signals to set a voltage between said first control electrode and said reference electrode to a predetermined value;

a second predrive circuit for driving the second power element by setting a voltage between said second control electrode and said second reference electrode to a predetermined value based on said logic signals;

a bypass circuit for forming an alternative path through which current flowing to a switching element is rerouted when the bypass circuit is on, said switching element being part of a charging path used for power supply capacitor charging, said bypass circuit being parallel connected to the switching element in the direction of current flow through the switching element; and a bypass control circuit for turning the bypass circuit on when the switching element cannot form a charging path because of the low voltage between terminals of the power supply capacitor.

29. A PWM inverter output circuit comprising:

a main dc power source;

a power circuit having a first power element comprising a first control and a first reference electrode, and being conductive when a predetermined voltage with respect to the first reference electrode is applied to the first control electrode, and a second power element comprising a second control electrode and a second reference electrode, and being conductive when a predetermined voltage with respect to the second reference electrode is applied to the second control electrode;

a control power source;

a power supply capacitor charged using an output voltage of the control power source;

an input signal processor for receiving a command signal which controls turning on and off said power elements and for producing predetermined logic signals;

a first predrive circuit:

comprising a first output driver having a pair of switching elements serially connected between terminals of the power supply capacitor, and driving said first power element by controlling turning on and off the switching elements based on said logic signals to set a voltage between said first control electrode and said first reference electrode to a predetermined value;

a second predrive circuit for driving the second power element by setting a voltage between said second control electrode and said second reference electrode to a predetermined value based on said logic signals;

a charging means comprising:

an initial charging means for sweeping current for charging the power supply capacitor before a start of operation, and a refresh charging means for sweeping current for charging the power supply capacitor after operation starts; and a charging path comprising:

a first path connecting one end of the control power source and one end of the power supply capacitor through an output terminal of said power circuit, and a second path connecting the other end of the power supply capacitor and the other end of the control power source through said charging means, said power supply capacitor being charged by an output voltage from the control power source passed via said charging path.

30. A PWM inverter output circuit comprising:

a main dc power source;

power circuit having:

a first power element comprising a first control electrode and a first reference electrode, said first power element being conductive when a predetermined voltage with respect to the first reference electrode is applied to the first control electrode, and a second power element comprising a second control electrode and a second reference electrode, and being conductive when a predetermined voltage with respect to the second reference electrode is applied to the second control electrode;

a control power source;

a power supply capacitor being charged by an output voltage of the control power source;

an input signal processor for receiving an input command signal which controls turning on and off said first and second power elements and for producing a predetermined plurality of logic signals;

a first predrive circuit comprising an output driver having a pair of switching elements serially connected between terminals of the power supply capacitor, said first predrive circuit driving said first power element by controlling turning on and off said switching elements based on said logic signal to set a voltage between said first control electrode and said first reference electrode to a predetermined value;

a second predrive circuit for driving the second power element by controlling a voltage applied to said second control electrode and a voltage applied to said second reference electrode to predetermined values respectively based on said logic signal;

a charging means for sweeping current for charging the power supply capacitor; and a charging path comprising a first path connecting one end of the control power source and one end of the power supply capacitor through an output terminal of a power circuit, and a second path connecting the other end of the power supply capacitor and the other end of the control power source through said charging means, said power supply capacitor being charged by an output voltage from the control power source passed via said charging path.

31. A PWM inverter output circuit comprising:

a main dc power source;

a power circuit having:
   a first power element comprising a first control electrode and a first reference electrode, and being conductive when a predetermined voltage with respect to the first reference electrode is applied to the first control electrode, and
   a second power element comprising a second control electrode and a second reference electrode, and being conductive when a predetermined voltage with respect to the second reference electrode is applied to the second control electrode;

a control power source;

a power supply capacitor charged using an output voltage of the control power source;

an input signal processor for receiving a command signal which controls turning on and off said power elements and for producing a predetermined plurality of logic signals;

a first predrive circuit comprising:
   a state detection circuit for detecting a requested control state from a combination of the plurality of logic signals output from the input signal processor,
   a latch circuit for holding a control state detected by the state detection circuit, and
   an output driver comprising a pair of switching elements serially connected between terminals of the power supply capacitor for controlling a voltage between the first control electrode and the first reference electrode,
   said output driver driving said first power element using the power supply capacitor as a power source by controlling turning on and off said switching elements based on said requested control state held by the latch circuit to control a voltage between the first control electrode and the first reference electrode and a voltage between the second control electrode and the second reference electrode; and a second predrive circuit for driving the second power element by controlling a voltage applied to said second control electrode and a voltage applied to said second reference electrode to a predetermined values based on said logic signals.

* * * * *